(12) United States Patent
Hiray et al.

(10) Patent No.: US 12,380,894 B2
(45) Date of Patent: Aug. 5, 2025

(54) SYSTEMS AND METHODS FOR CONTEXTUAL MODELING OF CONVERSATIONAL DATA

(71) Applicant: RingCentral, Inc., Belmont, CA (US)

(72) Inventors: Sushant Hiray, Redwood City, CA (US); Prashant Kukde, Milpitas, CA (US)

(73) Assignee: RingCentral, Inc., Belmont, CA (US)

( * ) Notice: Subject to any disclaimer, the term of this patent is extended or adjusted under 35 U.S.C. 154(b) by 264 days.

(21) Appl. No.: 18/323,083

(22) Filed: May 24, 2023

(65) Prior Publication Data
US 2024/0395258 A1   Nov. 28, 2024

(51) Int. Cl.
G10L 17/06    (2013.01)
G10L 15/04    (2013.01)
G10L 15/08    (2006.01)
G10L 15/22    (2006.01)

(52) U.S. Cl.
CPC ............ G10L 17/06 (2013.01); G10L 15/04 (2013.01); G10L 15/08 (2013.01); G10L 15/22 (2013.01)

(58) Field of Classification Search
CPC ......... G10L 17/06; G10L 15/04; G10L 15/08; G10L 15/22
See application file for complete search history.

(56) References Cited

U.S. PATENT DOCUMENTS

| | | | |
|---|---|---|---|
| 10,440,181 B1 | 10/2019 | Brown et al. | |
| 11,212,389 B2 | 12/2021 | Brown et al. | |
| 11,386,468 B2 | 7/2022 | Tortoriello et al. | |
| 11,580,961 B1* | 2/2023 | Jawale | G06F 40/30 |
| 2007/0067159 A1* | 3/2007 | Basu | H04M 3/2281 704/200 |
| 2009/0306979 A1* | 12/2009 | Jaiswal | G10L 15/063 704/235 |
| 2015/0201077 A1 | 7/2015 | Konig et al. | |
| 2022/0060345 A1 | 2/2022 | Wiener et al. | |

FOREIGN PATENT DOCUMENTS

WO   WO-2024226024 A1 * 10/2024

OTHER PUBLICATIONS

Automatic Acoustic Events Detection, Classification, and Semantic Annotation for Persistent Surveillance Applications (Year: 2014).*

* cited by examiner

*Primary Examiner* — Mohammad K Islam
(74) *Attorney, Agent, or Firm* — Ansari Katiraei LLP; Arman Katiraei; Sadiq Ansari

(57) ABSTRACT

Disclosed is a conference monitoring system that classifies conversations and performs automated actions based on different context detected within the conversations. The system receives conversations that result in an unsuccessful engagement, classifies different segments of the conversations with contextual trackers that identify different context within each segment, and determines a recurring pattern of a common set of contextual trackers in different segments of the conversations that contribute to the unsuccessful engagement. The system monitors a particular conversation, tags one or more segments of the particular conversation with the common set of contextual trackers, and performs an automated action that contributes to a successful engagement in response to tagging the one or more segments with the common set of contextual trackers and the common set of contextual trackers contributing to the unsuccessful engagement.

20 Claims, 13 Drawing Sheets ns about customers based on a contextual modeling of best
SYSTEMS AND METHODS FOR CONTEXTUAL MODELING OF CONVERSATIONAL DATA

TECHNICAL FIELD

The present disclosure relates generally to the field of audio and video conferencing. Specifically, the present disclosure relates to systems and methods for automated control of the audio and/or video conferences based on a contextual modeling of the conversational data.

BACKGROUND

The monitoring of conferences or conversations provides data for differentiating between effective and ineffective strategies and for gauging the performance of individual representatives. However, the volume of conferences or conversations that occur in a given day make it difficult for managers to listen in on every conference or conversation or to fully review and rate the performance associated with each conversation or each representative.

Transcription services generate text for the spoken dialog. The resulting transcript may be searched for keywords or phrases that isolate relevant parts of a conference or conversation. However, the keywords or phrases lack context and may isolate the wrong parts of a conference or conversation. Also, the searched for keywords or phrases may differ from the wording or phrasing that is used during a conference, and may fail to locate the relevant parts. Even if the keywords or phrases isolate desired parts of a conference, the transcript does not capture the sentiment, emotions, and behavior of the conference participants, thereby omitting significant context for fully understanding what transpired at those parts of the conference.

DETAILED DESCRIPTION OF PREFERRED EMBODIMENTS

Figure 1:
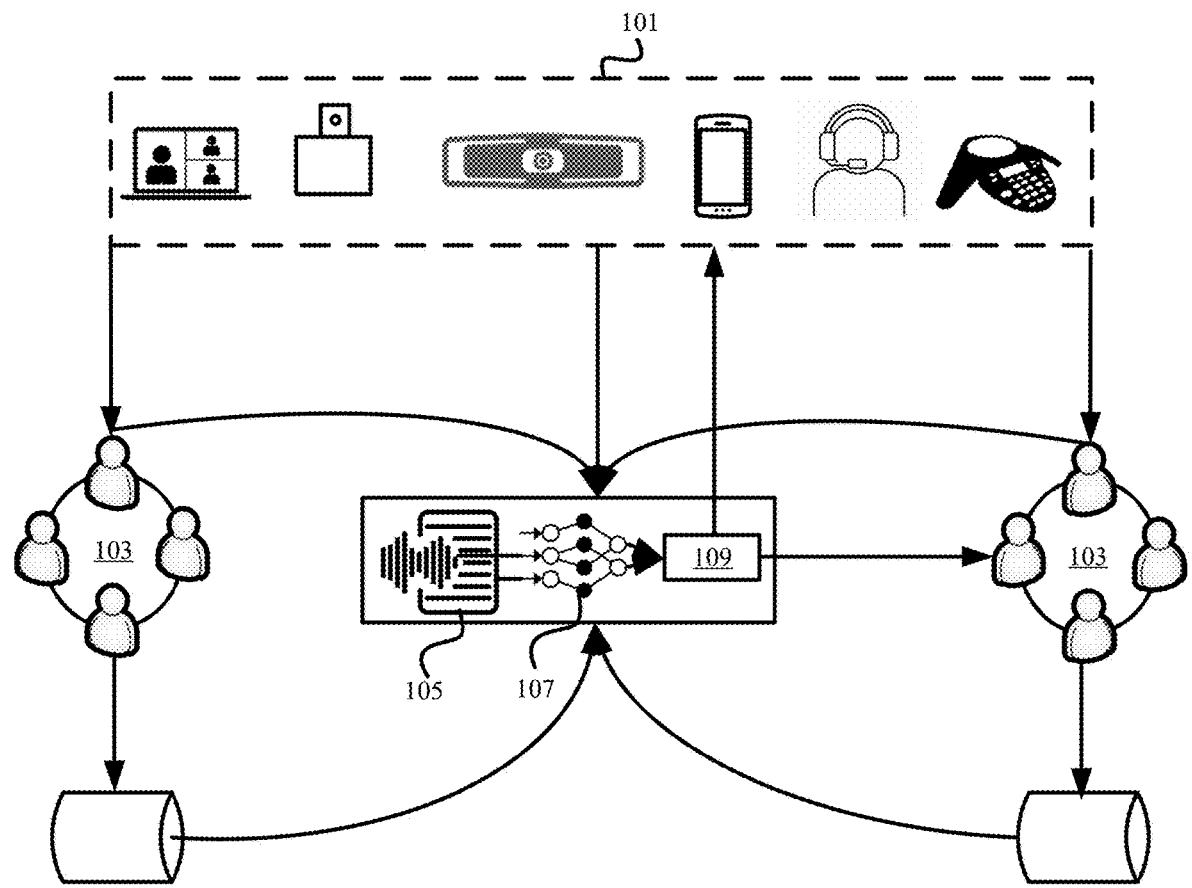
FIG. 1 illustrates an example architecture for an automated conference monitoring system in accordance with some embodiments presented herein.

The current disclosure provides a technological solution to the technological problem of monitoring audio and video conferences across an organization. The technological solution automates the conference monitoring by using artificial intelligence and/or machine learning ("AI/ML") techniques to attribute context to the conversational data based on the spoken dialog as well as sentiment, emotions, and behavior of the conference participants. The context represents a classification of the activity, events, and/or behaviors that occur at different parts of a conference. More specifically, the attributed context supplements the transcription of the spoken dialog by annotating segments of the conference with summarized elements for the discussed topics, identifiers for the adherence to or deviation from best practices or desired behavioral paradigms, performance metrics, and/or factors that summarize the engagement in each segment independent of the spoken dialog. The technological solution further automates the conference monitoring by providing actionable data and/or performing automated actions based on the context associated with the annotated segments. The actionable data and/or automated actions improve conference outcomes, implement best practices, ensure adherence to desired behavioral paradigms, and/or generate models for increasing or improving effectiveness across the organization.

An automated conference monitoring system attributes the context to the monitored conversations, generates the actionable data from the attributed context, and uses the actionable data to provide a set of customized and automated services. In some embodiments, the automated conference monitoring system provides real-time conversational oversight, support, and chatbot interaction, dynamic training and coaching, and/or customized content.

The automated conference monitoring system performs a context-aware speech-to-text transcription of audio as part of the automated conference monitoring. The context-aware speech-to-text transcription improves the accuracy of the text that is generated from the conference audio by incorporating feedback signals and metadata from the conference devices and/or the conference provider, entity-specific or industry-specific taxonomies, and/or user inputs. The automated conference monitoring system uses these feedback signals to differentiate and/or verify the identity of different speakers participating in a conference and/or the correct names and spelling for the products, services, and/or features that are mentioned throughout the conference. Consequently, the transcriptions are attributed to the correct speakers, and jargon is correctly transcribed based on context associated with the entity rather than being transcribed based on a pure phonetic conversion or incorrect matching of the jargon to standard dictionary words.

The automated conference monitoring system trains different AI/ML techniques to define and detect different contexts associated with different organizational departments, roles, and/or states associated with organizational tasks. Defining and detecting the different contexts includes determining the data that is most relevant to each department, role, and/or task state, and determining the patterns within the audio segments and/or transcriptions that identify or embody that data. For instance, training the AI/ML techniques may include analyzing conferences conducted by a particular department, and selecting a set of contextual elements that is used to gauge performance within the particular department, determine adherence to best practices or desired behavioral paradigms set for the particular department, and/or coach or train representatives in the particular department. The set of contextual elements may include specific topics (e.g., budgets, time-to-implement, and functionality needs) that should be mentioned for successful engagement by the particular department, the use of a specific question format (e.g., open-ended questions instead of close-ended questions), a length of time that representatives of the particular department should speak during a conference (e.g., short-length conversations instead of long-length conversations), and/or speaker behavior (e.g., tracking the representative's sentiment, energy, asking of personal questions, etc.). The AI/ML techniques analyze the conversations conducted by different departments, users with different roles, and for deals or tasks at different states to generate the contextual models with the contextual elements that are customized for each department, user role, and/or task state.

The automated conference monitoring system uses the contextual models to attribute contextual elements to specific segments or snippets of a conference and/or to the transcribed text from those specific segments or snippets. The contextual elements summarize the context within those segments or snippets. The summarized context differs from the words of the spoken dialog and the transcribed text as the summarized context identifies conference-related or task-related topics, speaker behaviors, speaker actions, and/or other identifiers for identifying the context taking place in segment or snippet. The summarized context therefore provides supplemental data for searching or analyzing the conversations beyond just the spoken words.

The automated conference monitoring system generates summarized reports for each conference or a set of conferences based on the attributed context. Generating the summarized reports includes organizing or arranging the contextual elements attributed to one or more conferences based on the modeled relevance of those contextual elements to the department or role associated with the user viewing or request the summarized reports and/or based on the modeled relevance to the state of the task discussed in the one or more conferences. The summarized reports provide objective data (e.g., the contextual elements) for ascertaining the quality, subject matter, performance, and behavior exhibited across hundreds of conferences involving different representatives of an organization without a single user listening in on or reading the transcripts of each conference.

The automated conference monitoring system generates automated actions from the context attributed to each monitored conference. For instance, the automated conference monitoring system may customize the training or coaching for individual representatives based on the behavioral context attributed to the conferences involving those individual representatives, may perform actions that change the outcome, flow, or interactions of an active conference based on the contextual elements of the active conference adhering to or deviating from modeled or desired best practices, may generate targeted actions for directing future conferences based on successful engagement models that are derived from the contextual elements attributed to conferences having a positive or desired outcome, and/or may automatically verify or validate goals, performance, and milestones of the organization, teams within the organization, and/or individuals within a particular team based on a contextual definition of the goals, performance, and milestones.

In some embodiments, the automated conference monitoring system generates chatbots that directly interact with representatives or agents of an entity. In some such embodiments, the chatbots use the contextual elements from the conferences conducted by those representative or agents as objective data for training or coaching purposes. For instance, the chatbots may use the contextual elements to identify specific segments of a conversation where the representative deviated from best practices or desired behavioral paradigms, and to present specific changes that the representative may implement to improve performance.

In some embodiments, the automated conference monitoring system generates chatbots that directly interact with customers and/or assume the roles of the entity representatives or agents. In some such embodiments, the chatbots generate audio or text that directly addresses customer concerns or questions, that present products or services, and that adhere to the contextual elements associated with a successful engagement, best practices, and/or desired behavioral paradigms. In other words, the chatbots may change the topics that are discussed, the tone with which the topics are discussed, the type and number of questions that are asked, the speaking duration, and/or other behaviors according to the different sets of contextual elements that are associated with successful engagement of customers from different departments, roles, and/or task states.

In some embodiments, the chatbots correspond to generative AI tools that generate assistive content to support representatives. In some such embodiments, the chatbots monitor active conversations between representatives and third-parties, analyze the dialog and the context associated with the dialog, generate customized content based on the analyzed dialog and context, and present the customized content to support the representatives in providing detailed answers to questions asked by third-parties at any point during the active conversations, supplemental information about topics that are currently being discussed, promotions that are activated once a sequence of context has been satisfied, and/or alert the representatives about behaviors that deviate from best practices or that may improve the outcome of the conversation.

FIG. 1 illustrates an example architecture for automated conference monitoring system 100 in accordance with some embodiments presented herein. Automated conference monitoring system 100 integrates with conference devices 101 and/or conference service providers 103.

Conference devices 101 include the devices with which conference participants join and participate in a conference. Conference devices 101 include microphones for capturing audio, and speakers for playing back audio. Conference devices 101 may further include cameras for capturing video, and displays for presenting images or video of other conference participants. Processor, memory, storage, network, and/or other hardware resources of conference devices 101 are used to connect one or more users to a conference, distribute audio and/or video streams from the local users to the conference, and/or receive and playback audio and/or video from other users that are connected to the conference. Conference devices 101 may include desktop computers, laptop computers, tablet devices, smartphone devices, telephony devices, and/or other conferencing equipment.

Conference service providers 103 host the conferences and/or establish the connectivity between different conference devices 101. For instance, conference devices 101 submit requests to join a particular conference that is identified with a unique Uniform Resource Locator ("URL"), name, or another identifier. Conference service provider 103 authorizes access to the particular conference based on stored or configured information about the users or conference devices 101 that are permitted to join the particular conference, created accounts that identify the users, and/or other identifying information that is sent with the requests (e.g., network addressing, port numbers, device signatures, etc.).

Conference service providers 103 may multiplex the streams from the different conference devices 101 that are connected to the same conference, and may create a unified stream that is provided to each conference device 101. The unified stream may synchronize the audio and/or video from the different contributing streams, enhance the stream quality, enforce access controls (e.g., who is allowed to speak, which streams are muted, etc.), and dynamically adjust stream quality based on the quality of the network connection to each conference device 101.

Integrating automated conference monitoring system 100 with conference devices 101 and/or conference service providers 103 includes providing the conference streams or a copy of the conference streams to automated conference monitoring system 100. In some embodiments, automated conference monitoring system 100 receives the unified stream that is generated for a particular conference by a particular conference service provider 103 based on the individual streams from each of the conference devices 101 that are connected to that particular conference. In some other embodiments, automated conference monitoring system 100 receives the individual streams from each of the conference devices 101 that are connected to the same conference. The streams include the encoded audio and/or video from each conference participant.

The integration of automated conference monitoring system 100 with conference devices 101 and/or conference service providers 103 may also provide automated conference monitoring system 100 with account information, metadata, and/or other user identifying information associated with each of the streams or conference participants. For instance, automated conference monitoring system 100 obtains session information associated with each stream or conference. The session information may include the Internet Protocol ("IP") addresses, port numbers, and/or other device identifying information associated with each conference device 101 that is a connected endpoint to a conference. The session information may include the account information used by each conference device 101 to join a conference. The account information may include the email address, username, or other user identifying information that is provided by a user as part of the user joining the conference, that is used to authorize the user for access to the conference, or that identifies the user during the conference.

In some embodiments, the integration further provides automated conference monitoring system 100 access to email, text message, instant message, and/or other communication accounts or systems of the representatives or agents that belong to an organization or a specific entity. Automated conference monitoring system 100 may use the access to these additional communication accounts or systems in order to perform automated actions such as scheduling follow-up meetings, sending follow-up emails, and/or directly communicating with the representatives or agents when providing real-time assistance or providing coaching or training. Additionally, automated conference monitoring system 100 may obtain additional context from these additional communication accounts or systems, and may use the additional context to improve the speech-to-text transcription and/or identify the same participant in different conferences using different conference devices 101.

Automated conference monitoring system 100 includes context-aware speech-to-text converter 105, one or more neural networks 107, and controller 109. Automated conference monitoring system 100 executes on one or more devices or machines that are part of or separate from the devices or machines of conference service providers 103.

In some embodiments, automated conference monitoring system 100 is a centralized system that performs the automated conference monitoring on behalf of different organizations or entities. In some other embodiments, automated conference monitoring system 100 is a localized system that performs the automated conference monitoring on-premises or in the private cloud or network of a specific organization or entity.

Context-aware speech-to-text converter 105 receives different conference audio and/or video streams and supplemental information that is associated with the conference streams from conference devices 101 and/or conference service providers 103. The supplemental information may include account information, metadata, and/or user identifying information for the conference participants.

Additionally, context-aware speech-to-text converter 105 may retrieve different taxonomies that are defined by the entities associated with the conference streams. A taxonomy may include entity-specific or industry-specific terms for products, services, tasks, operations, and/or other jargon used by the entities.

Context-aware speech-to-text converter 105 transcribes the audio in the received streams using the supplemental information. Specifically, context-aware speech-to-text converter 105 uses the account information, metadata, and/or other user identifying information to identify the conference participants, obtain voice signatures for the identified participants, and associate the transcribed text to the correct speakers based on the identification of the conference participants and/or the voice signatures. Context-aware speech-to-text converter 105 may use the taxonomy and/or the voice signatures to improve the transcription accuracy. For instance, jargon that is specific to a particular product or product names that have spellings that differ from their phonetic sounds may be matched to the correct terms or phrases in the taxonomy, and thereby transcribed correctly. Similarly, the voice signatures may account for individual user accents and/or different ways with which different users speak or pronounce the same words. Context-aware speech-to-text converter 105 may use the voice signatures to better differentiate the spoken text.

Neural networks 107 may use different AI/ML techniques to determine the relevant context for each organization or entity. More specifically, neural networks 107 may determine the different sets of context that are relevant for assessing performance of representatives that are in different departments or roles of the organization or that handle tasks at different states in the organization workflow, for differentiating between successful or unsuccessful engagement in the different departments, roles, or task states, and/or for defining best practices and/or desired behavioral paradigms for the different departments, roles, or task states.

In some embodiments, the relevant context may be defined from user input. For instance, the user input may specify a first set of context that a first manager of an organization uses to evaluate the performance of sales team members, and a second set of context that a second manager of the organization uses to evaluate the performance of support team members. In some such embodiments, neural networks 107 may analyze the conferences involving the sales team members and the support team members, and may modify the first and second sets of context based on a changing frequency with which different context is referenced in the conferences.

The relevant context may include topics that are discussed (e.g., product names, budget discussions, pricing, timing, deployment, installation, configuration, etc.), speech-related context (e.g., sentiment, tone, talk time, length of monologue, average conversation length, number of interruptions, number of questions, types of questions, objections, etc.), and/or other elements that may be detected from the conference audio, video, and/or transcript. The context therefore differs from the spoken dialog or transcribed text of a conference, and provides different classifications for the spoken dialog or transcribed text in different segments or snippets of the conference.

Neural networks 107 analyze the different segments or snippets of a conference, and provide the contextual classifications or contextual identifiers for the relevant context detected in each segment or snippet. For instance, neural networks 107 may detect audio and/or signaling characteristics of laughter in a first snippet, and may classify the first snippet with a laughter contextual identifier when laughter is defined as relevant context for the associated conference. Similarly, neural networks 107 may detect phrasing and a sentence structure that is consistent with the discussion of pricing in a second snippet, and may classify the second snippet with a pricing contextual identifier when pricing is defined as relevant context for the associated conference.

Neural networks 107 generate contextual summaries for each conference based on the context that is attributed to the conference segments or snippets. The contextual summaries present the context that is detected within the different conference segments, and link the presented context to the corresponding conference segments or parts of the conference transcript where the identified context is detected. A user may inspect a contextual summary to quickly identify the context at different parts of a conference without having to listen to the audio, read the transcript, or perform queries for exact words spoken during the conference. For instance, the contextual summary for a particular conference may identify the segments where the topic of pricing is discussed, the conversation tone turns negative, a participant raises objections or asks questions, and/or the conversation deviates from specified best practices or a desired behavioral paradigm.

Controller 109 uses the contextual summaries to produce actionable data. In some embodiments, controller 109 generates actionable data for coaching or training purposes. In some such embodiments, the actionable data includes selecting or presenting the context related to strengths or weaknesses of a representative and links to the conference segments that objectively evidence the identified strengths or weaknesses. In some embodiments, the actionable data includes performance metrics related to certain products, departments, tasks, or teams.

Controller 109 uses the contextual summaries to perform automated actions. In some embodiments, controller 109 performs automated actions including retrieving or generating custom content to present to one or more participants of an active conference or at the conclusion of the conference, generating action plans for future conferences involving certain products, individuals, or deals, altering best practices and/or strategies to achieve higher conversion rates or profitability, prioritizing or reordering deal execution based on tracked progress, and/or automatically connecting managers to problematic conferences. Other automated actions include generating a chatbot that assumes the role of a conference participant or dynamically supports the role of the conference participant. For instance, the chatbot may directly communicate with other conference participants with audio and/or text that is generated according to the context associated with a best practice or desired behavioral paradigm defined for the assumed role. Alternatively, the chatbot may analyze a conversation in real-time, and generate customized content to address questions that are asked, provide supplemental information about discussed topics, provide promotions or other content when a specific sequence of context associated with a given topic, user role, or task state is detect, and/or generate alerts for changing behavior in response to detecting deviations from desired behavioral paradigms. The chatbot may also assume the role of a team manager, and may provide coaching and training directly to the representatives. For instance, the chatbot may analyze the contextual summary that is generated from conferences involving a particular representative, and may present the context in the contextual summary that identifies the particular representative deviating from best practices or a desired behavioral paradigm.

Figure 2:
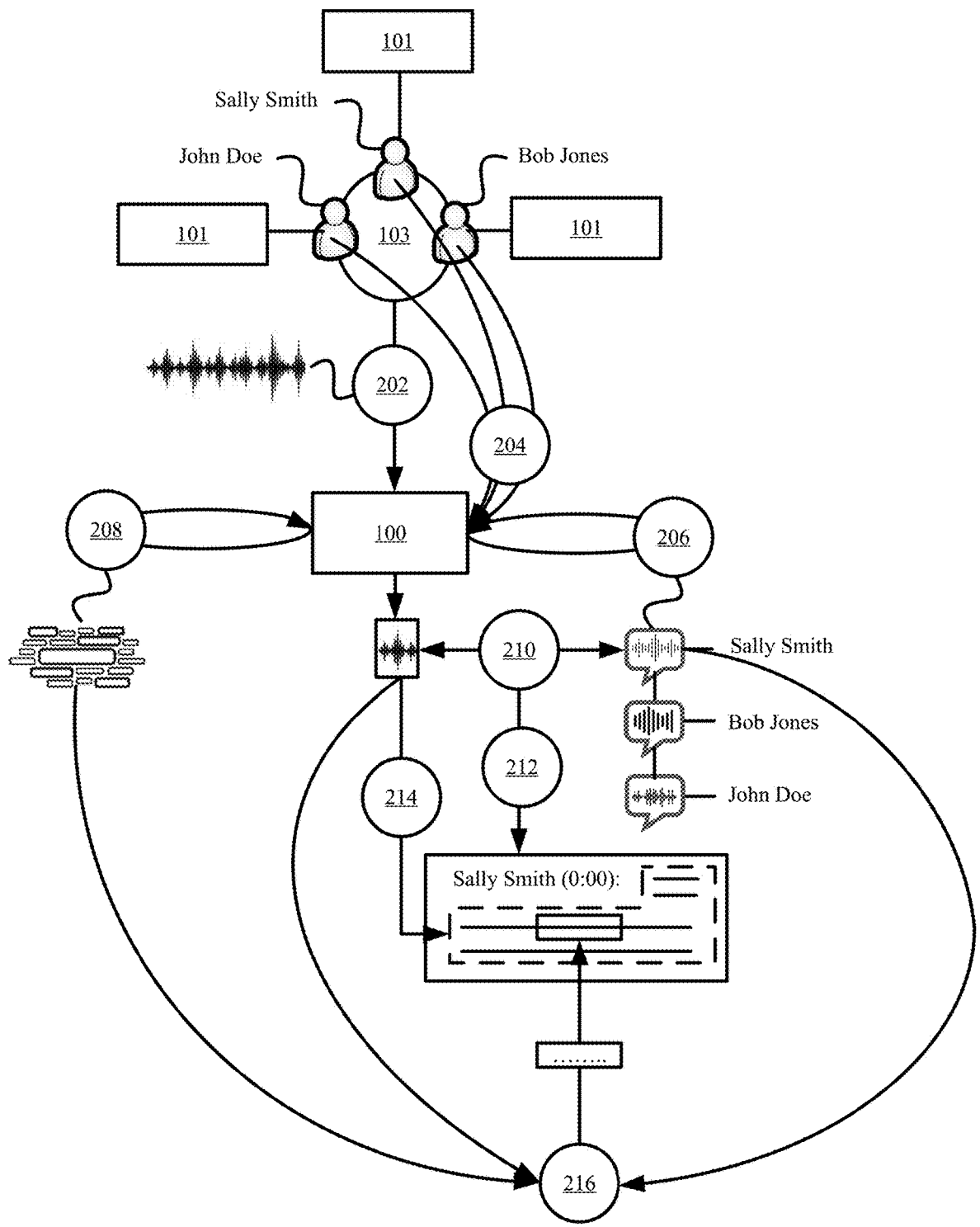
FIG. 2 illustrates an example of performing a context-aware text-to-speech transcription in accordance with some embodiments presented herein.

FIG. 2 illustrates an example of performing the context-aware text-to-speech transcription in accordance with some embodiments presented herein. The transcription is performed by context-aware speech-to-text converter 105 of automated conference monitoring system 100.

Automated conference monitoring system 100 receives (at 202) a feed from a particular conference that is active and ongoing or that has completed. In some embodiments, the feed is comprised of one or more streams with encoded audio and/or video passing between conference devices 101 connected to the particular conference and/or the conference service provider 103 for the particular conference. In some embodiments, the feed is extracted or separated from a combined audio and video encoding of the particular conference.

Automated conference monitoring system 100 receives (at 204) session information related to the particular conference. The session information may include identifiers for conference devices 101 that are connected to the particular conference. The identifiers may include network addressing of the connected conference devices 101 or device fingerprints or signatures that uniquely identify each of the connected conference devices 101. Automated conference monitoring system 100 may perform a lookup of the unique device fingerprints or signatures to identify the users or user accounts associated with each conference device. In some embodiments, the session information includes the user identifying information or user account information. For instance, the session information specifies the email address, username, or other identifier that identifies each participant of the particular conference.

Automated conference monitoring system 100 may optionally retrieve (at 206) voiceprints that may be stored for each participant based on the session information. In some embodiments, the voiceprints may include audio samples of different participants involved in the particular conference. The audio samples are identified using the session information. The audio samples may include recordings of the different participants speaking in previous conferences. If a participant has not engaged in a previous conference that is monitored by automated conference monitoring system 100, then no voiceprint may be available for that participant.

In some embodiments, the voiceprints may be defined based on voice characteristics of the different participants. The voice characteristics may identify the normal tone, pitch, speaking rate, accent, sentence structure, and/or other identified speaking qualities of the different participants, and may be used to detect when each participant is speaking in particular conference.

Automated conference monitoring system 100 selects (at 208) a customized taxonomy that is applicable to the particular conference. In some embodiments, automated conference monitoring system 100 includes a database that stores different customized taxonomies for specialized terms, phrases, and/or jargon used by different organizations or entities. In some embodiments, automated conference monitoring system 100 operates with respect to conferences conducted by representatives of a single organization, and updates the taxonomy as the organization introduces new products, services, or terminology. Automated conference monitoring system 100 evolves the taxonomy based on the automated conference monitoring, and the detection of new terminology or phrasing that differs from what is stored in the taxonomy and/or that differs from the ordinary usage of those terms or phrases. In some embodiments, automated conference monitoring system 100 uses an AI/ML technique to differentiate between new products, services, or terminology that are relevant for the customized taxonomy from other unrecognized wording that are irrelevant to the customized taxonomy of the organization or entity. In some such embodiments, the AI/ML technique may base the differentiation on the frequency with which terms are mentioned in association with certain topics or context, which speaker (e.g., a representative or third-party participant) mentions the terms, the naming methodology or theme used by the organization (e.g., naming products based on animals, locations, historical characters, etc.), and/or other patterns detected within the current taxonomy.

Automated conference monitoring system 100 matches (at 210) a snippet from the received audio feed to a particular user or conference device 101 using the session information and/or voiceprints. The matching (at 210) may be based on the network addressing or fingerprint of the conference device 101 sending the particular stream that contains the snippet or that is identified as the source of the snippet. The matching (at 210) may also include matching the pitch, tone, and/or other voice characteristics of the snippet by a threshold amount to the voice characteristics within a voiceprint of the particular user.

Automated conference monitoring system 100 performs the matching (at 210) in order to assign and/or identify the correct user for the speech that is being converted to text in the selected snippet. Other transcription services may transcribe the speech regardless of who is speaking which makes the transcription difficult to follow when there is an exchange between two or more participants, when different participants give opposing or conflicting opinions or thoughts on specific subject matter, or when different participants talk over or interrupt one another.

The speech-to-speaker matching (at 210) is also useful for speaker attribution. For instance, two sales agents may be on the same call with a customer. The two sales agents may connect via the same conference device 101 such that the session identifying information provides information for the single conference device 101 which suggests that there is only one participant at that end of the call. The matching (at 210) based on the voiceprints eliminates the confusion as to who is speaking from the sales agent side of the call, and correctly attributes transcribed text from that side of the call to the correct sales agent. Accordingly, if one sales agent is responsible for closing a deal and the other sales agent is responsible for jeopardizing the deal, the matching (at 210) identifies which sales agent said what so that the contributions of each sales agent are correctly attributed to the individuals in the transcript.

Automated conference monitoring system 100 enters (at 212) a speaker identifier in the transcript. The speaker identifier identifies the user or individual that is identified as the speaker in the snippet. In some embodiments, a timestamp or time value is also entered (at 212) with the speaker identifier. The timestamp indicates the time within the feed that the identified user begins speaking and/or the start time of the snippet within the conference.

Automated conference monitoring system 100 transcribes (at 214) the audio from the snippet to text using one or more speech recognition services. The text is entered into the transcript after the speaker identifier.

Automated conference monitoring system 100 corrects (at 216) the transcribed text based on one or more of the received (at 204) session information, the received (at 206) voiceprints, or the selected (at 208) customized taxonomy. Automated conference monitoring system 100 corrects (at 216) the transcribed text by applying context from the session information, voiceprints, and customized taxonomy when transcribing (at 212) the audio and/or to the resulting text. For instance, the session information may identify the department or role that the speaker has within an organization. Automated conference monitoring system 100 may filter the customized taxonomy to identify the subset of products, services, phrases, and/or other jargon that is relevant to that department or role, and may improve the transcription accuracy by detecting the phonetic equivalent of the jargon and by entering the correct words or phrases for that jargon from the filtered taxonomy in the transcript. More generally, automated conference monitoring system 100 may match phonetically transcribed words without a dictionary equivalent, words or phrases that violate grammatical sentence structure, abbreviations, codenames, and/or other seemingly out-of-place or fabricated words to product, service, project, or internal task names, employee names, company roles, or jargon that is specific to the industry or entity that is associated with the discussion. Additionally, automated conference monitoring system 100 may use the voiceprints to account for accents and the different ways with which the same words may be pronounced by different users to improve the transcription accuracy.

Automated conference monitoring system 100 may continue selecting additional snippets or segments of the conference until the entirety of the received (at 202) feed is transcribed or the particular conference ends. Whenever the speaker's voice changes and/or different session information is associated with a next snippet, automated conference monitoring system 100 changes the speaker identifier in the transcript, and uses context that is specific to that speaker to transcribe the audio from that next snippet.

In some embodiments, automated conference monitoring system 100 trains and generates language learning models ("LLMs") to perform the context-aware speech-to-text transcription. The LLMs may be trained for conferences involving representatives in different departments or that have different roles within an organization. For instance, a first context-aware speech-to-text LLM may be created and used to transcribe conferences involving sales representatives or the sales team, and a second context-aware speech-to-text LLM may be created and used to transcribe conferences involving customer support representatives. Each LLM is trained to accurately detect and transcribe the custom phrasing, jargon, sentence structure, and/or other conversational nuances that the different departments may use in discussions with other conference participants.

Figure 3:
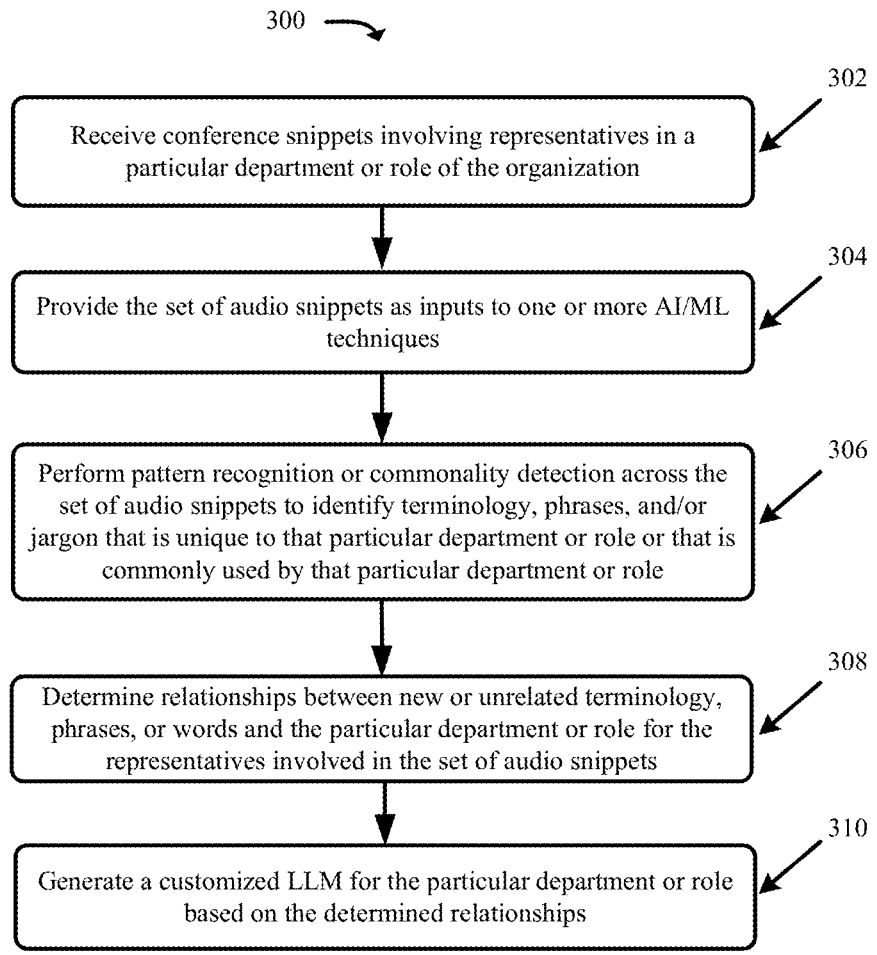
FIG. 3 presents a process for training customized language learning models ("LLMs") for the context-aware speech-to-text transcription in accordance with some embodiments presented herein.

FIG. 3 presents a process 300 for training customized LLMs for the context-aware speech-to-text transcription in accordance with some embodiments presented herein. Process 300 is implemented by automated conference monitoring system 100, and generates the customized LLMs for context-aware speech-to-text converter 105.

Process 300 includes receiving (at 302) conference snippets involving representatives in a particular department or role of the organization. For instance, automated conference monitoring system 100 aggregates a first set of audio recordings from representatives that conduct discovery calls on behalf of the organization, a second set of audio recordings from representatives that conduct product or service demonstrations on behalf of the organization, and a third set of audio recordings from representatives that provide support on behalf of the organization. Each set of audio recordings may be used to train different LLMs for improved or more accurate transcription of the custom dialog associated with each department.

Process 300 includes providing (at 304) the set of audio snippets as inputs to one or more AI/ML techniques. Each AI/ML technique is configured to detect different relationships in the set of audio snippets and/or to perform different distributions over the spoken words in each audio snippet. For instance, a first AI/ML technique may analyze the set of audio snippets for unrecognized words, phrases, or terminology, and a second AI/ML technique may analyze the set of audio snippets for abnormal usage or improper grammatical usage of recognized words, phrases, or terminology.

Process 300 includes performing (at 306) pattern recognition or commonality detection across the set of audio snippets to identify terminology, phrases, and/or jargon that is unique to that particular department or role or that is commonly used by that particular department or role. For instance, the representatives conducting the discovery calls may commonly refer to a set of products, the representatives conducting the demonstration calls may commonly refer to specific features of the products, and the representatives providing support may commonly use nicknames or abbreviations to refer to the same products or specific features. Accordingly, performing (at 306) the pattern recognition may involve detecting repeated terminology, phrases, and/or jargon in the set of audio snippets that differs from known or recognized terminology, phrases, and/or common dictionary terms. Performing (at 306) the pattern recognition may further involve detecting the unique terminology, phrases, and/or jargon based on sentence structure. For instance, a dictionary word that is repeatedly used improperly in a sentence (e.g., as a verb instead of a noun, as a noun instead of a verb, in combination with other words that are not commonly used together, etc.) may be flagged as a potentially meaningful term, phrase, or jargon that is unique to a specific department or role.

Process 300 includes determining (at 308) relationships between new or unrelated terminology, phrases, or words and the particular department or role for the representatives involved in the set of audio snippets. The relationships may be defined based on the frequency with which the new words are found in the set of audio snippets, unrelated words are found in combination in the set of audio snippets, and/or other relationships that are detected as a result of performing (at 306) the pattern recognition or commonality detection. In some embodiments, automated conference monitoring system 100 matches new words detected in the set of audio snippets to names that are associated with different products, services, or features of the organization. In some such embodiments, the matching is based on a phonetic equivalency match, and is used to determine the correct spelling for a new word that may otherwise be incorrectly transcribed based on phonics alone or matching to dictionary words.

Process 300 includes generating (at 310) a customized LLM for the particular department or role based on the determined (at 308) relationships. The customized LLM includes a connected set of synapses that are formed from the relationships and that map to a correct transcription for jargon that is specific to the particular department or role. For instance, the audio associated with particular jargon may not match any dictionary words, may have a pronunciation or phonetic sounds that differ from a proper spelling of the particular jargon, and/or may be unknown to someone unfamiliar with the jargon.

The transcripts that are produced by context-aware speech-to-text converter 105 using the customized LLMs accurately attribute the text to the correct speaker and accurately convert speech that may include jargon or other industry-specific or entity-specific terminology. The transcripts may be searched for transcribed words, and thereby used to isolate the snippets where those words were spoken.

To further assist individuals in understanding the contents of a call or conference without having to listen to the entirety of the audio or read through the entirety of the transcript, automated conference monitoring system 100 attributes contextual identifiers to each snippet of a conference, and generates contextual summaries for the conference based on the contextual identifiers. The contextual identifiers allow the conferences to be searched or analyzed on the basis of context rather than on the spoken words.

The context may relate to the topics that are discussed at different times in a conference, sentiment that is expressed at the different times, and/or metrics for conversational qualifiers (e.g., number of asked questions, types of questions, types of responses given to a question, number of interruptions, etc.). The context may also indicate whether conditions associated with best practices, desired behavioral paradigms, and/or other criteria are met or satisfied. For instance, the context may include classifying snippets where compliance checks were completed, the representative adhered to a script or best practices, a specified outcome was achieved (e.g., a completed sale, a demonstration was requested, a demonstration was completed, a discount was offered, etc.), and/or other conditions against which the conference is evaluated are satisfied.

By classifying the different parts of the conferences with context, automated conference monitoring system 100 provides more expansive and relevant search capabilities than if only the textual transcript of the conference was available for searching. For instance, rather than being limited to searching for specific words that were spoken during a conference, automated conference monitoring system 100 may process search queries and produce search results that identify where in a conference the representative interrupted a customer, the number of open-ended questions asked by the representative versus close-ended questions, which conferences involved discounts being offered, which conferences led to converted sales after a product demonstration was given, and/or other such contextual searches that are performed independent of the spoken words that are recorded in a conference transcript. These contextual searches are not possible if only the transcript of the conference was available for searching.

Automated conference monitoring system 100 generates the contextual summaries by tagging the transcripts and/or corresponding segments of a conference feed with contextual identifiers for the context that is detected within those segments. In some embodiments, automated conference monitoring system 100 trains neural networks 107 to detect and attribute the relevant context to different parts of the transcripts and/or conference feeds.

Figure 4:
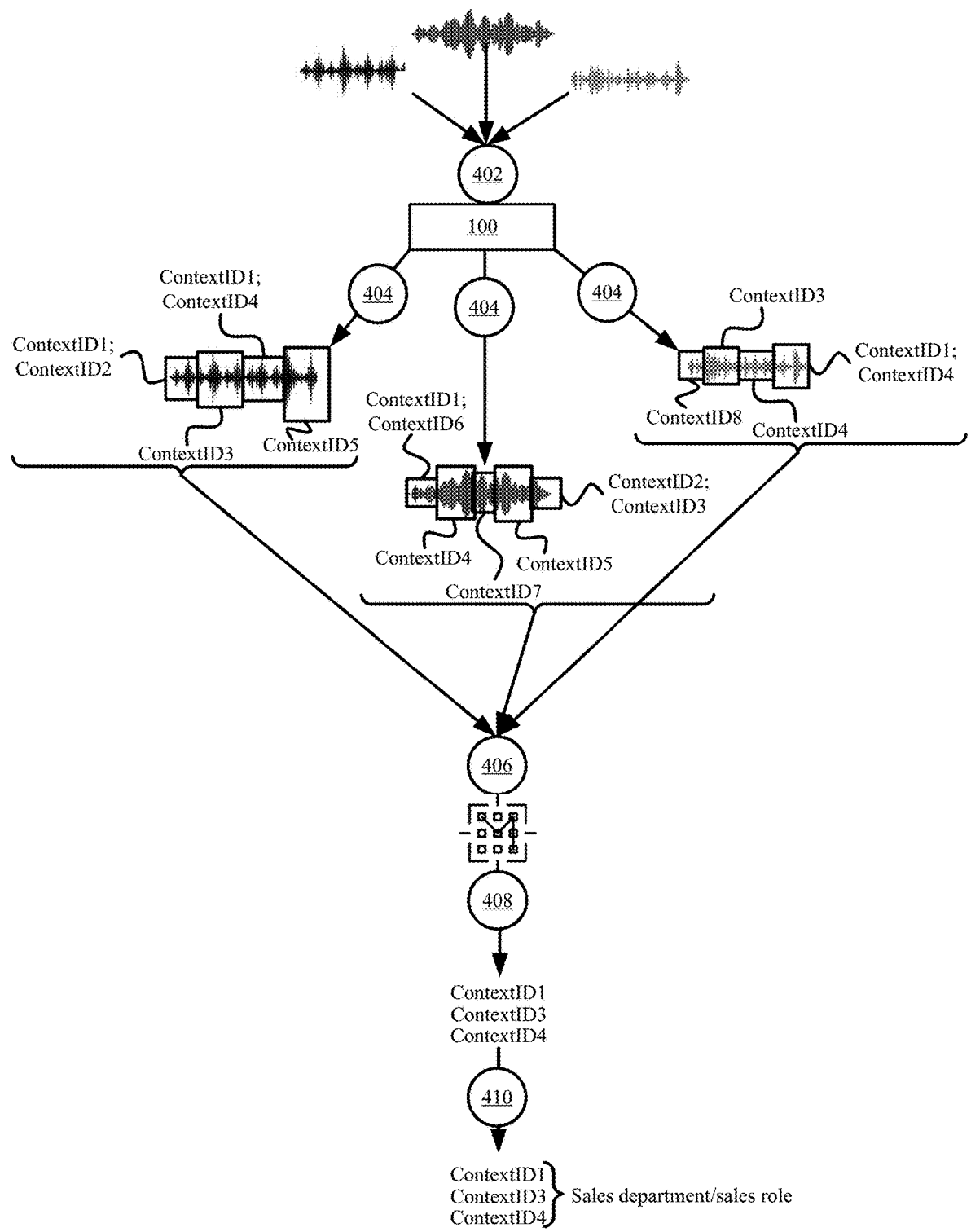
FIG. 4 illustrates an example of generating a model for providing context to a conference in accordance with some embodiments presented herein.

FIG. 4 illustrates an example of generating a model for providing context to a conference in accordance with some embodiments presented herein. Automated conference monitoring system 100 may receive (at 402) audio and/or video streams that share some commonality. For instance, the streams may be recordings of conferences conducted by a particular department, involving personnel with a particular role, and/or involving deals at a common state in a deal workflow.

Automated conference monitoring system 100 inputs the streams into one or more neural networks 107. Each neural network 107 may implement a different AI/ML technique that detects (at 404) different contextual trackers within each stream. For instance, neural networks 107 may be trained or defined to detect a sentence structure, intonation, and other elements of an open-ended question, and a different sentence structure, intonation, and other elements of a close-ended question. Similarly, neural networks 107 may be trained or defined to detect a first set of voice characteristics that are associated with engagement or interest, and a second set of voice characteristics that are associated with boredom or disinterest.

Neural networks 107 provide the contextual tracker or identifier that identifies the context that is detected (at 404) within each segment or snippet of a stream. Accordingly, first neural network 107 may analyze voice characteristics in the audio streams to detect different types of sentiment based on speaking tone, pitch, speaking rate, interruptions, laughter, and the like, and may assign contextual identifiers to different segments or snippets of the streams that identify the detected sentiment. Second neural network 107 may analyze speaking duration, amount of time between the speaker voice changing, and/or number of times and duration of multiple speakers speaking at the same time to detect speaker etiquette and/or the conference mood, and may assign contextual identifiers to different segments or snippets of the streams that identify the detected speaker etiquette and/or metrics associated with the tracked speaker etiquette. Third neural network 107 may analyze the transcript as well as inflections in the speaker's voice to determine when and what types of questions are asked during a conference, and may assign contextual identifiers to different segments or snippets of the streams that identify the types and numbers of questions asked in each segment or snippet. Fourth neural network 107 may analyze the transcript to detect discussed topics based on repeated words that have semantic similarity and that relate to one or more enumerated objectives, and may assign contextual identifiers to different segments or snippets of the streams that identify the detected topics in each segment or snippet. Accordingly, each neural network 107 may be configured to detect different context in different segments or snippets of the conference streams.

In some embodiments, neural networks 107 use semantic similarity to improve the context detection. For instance, neural networks 107 may determine semantic similarity between the word "price" and the words "cost", "fee", "amount", "total", and "expense", and may assign the same topic contextual tracker or contextual identifier to each segment or snippet of a conference that includes any of these words.

Neural networks 107 analyze (at 406) the contextual trackers assigned to each stream. Neural networks 107 detect (at 408) the subset of relevant context for the received (at 402) streams based on the recurrence of certain contextual trackers or a frequency with which the subset of relevant context is found in the received (at 402) streams. Detecting (at 408) the subset of relevant context includes detecting recurring patterns or trends in the wording, speaker behavior, signaling characteristics, and/or other properties of the different streams. For instance, relevant context may correspond to a contextual tracker that is assigned to at least 75% or a threshold number of the related streams.

Neural networks 107 generate (at 410) a contextual model with the detected (at 408) subset of relevant context. Generating (at 410) the contextual model includes linking the contextual model to the category or classification associated with the received (at 402) streams. In this example, the contextual model is generated (at 410) with the context that is determined to be relevant for conferences conducted by the same department, representatives having the same role, or for deals with the same state in a deal workflow as the received (at 402) streams.

Accordingly, neural networks 107 may generate specific contextual models for specific departments or roles of an organization or entity based on different sets of audio streams representing communications that representatives within those departments or roles have with others. The specific contextual models are then used to differentiate between the different relevant context and irrelevant context in conferences involving different departments, agent roles, or deal states. In other words, the relevant context that is modeled for determining the performance of agents with a sales role may be different than the relevant context that is modeled for determining the performance of agents with a support, billing, development, marketing, or other role.

Figure 5:
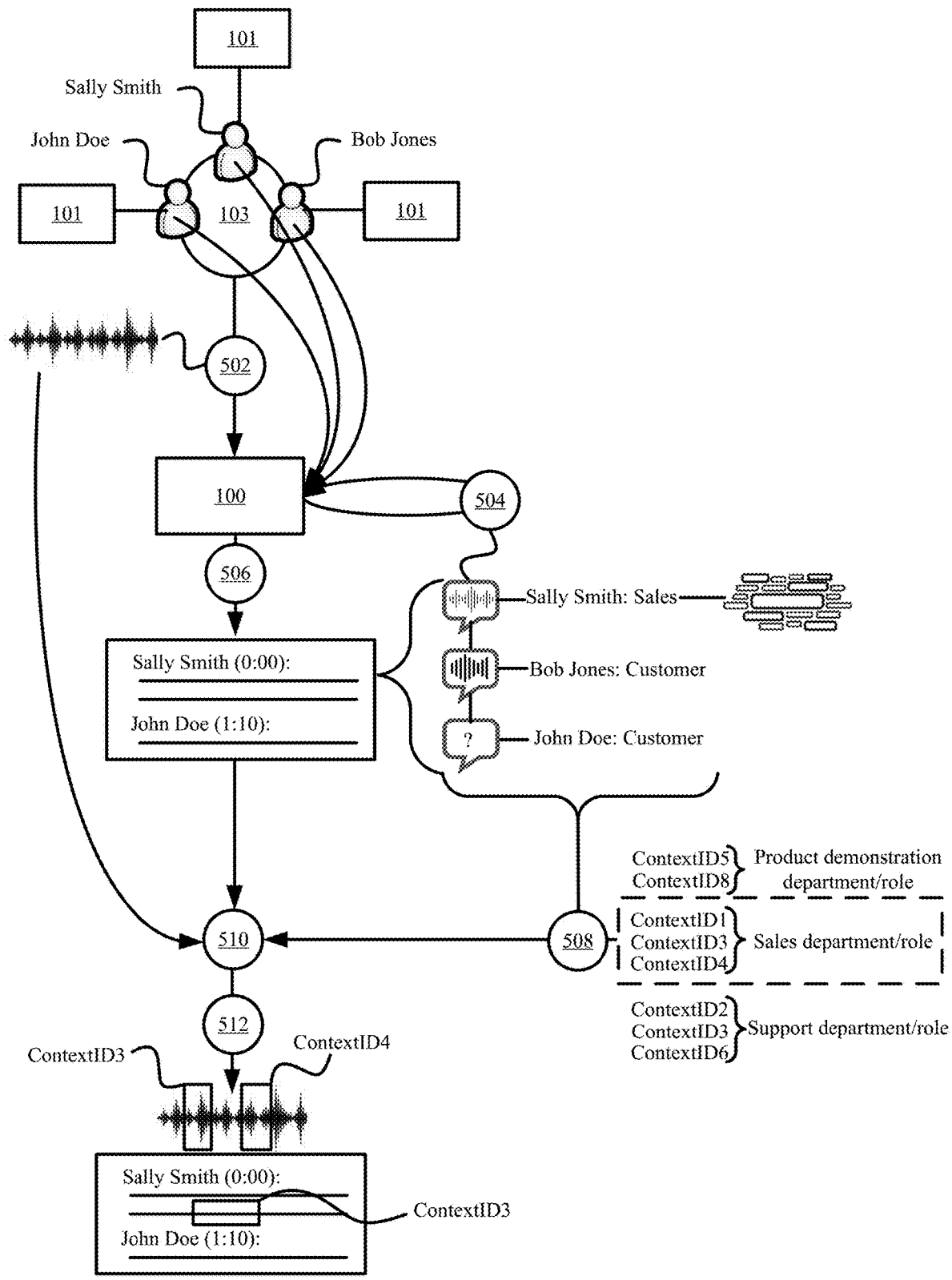
FIG. 5 illustrates an example of tagging a conference with specific contextual trackers in accordance with some embodiments presented herein.

FIG. 5 illustrates an example of tagging a conference with specific contextual trackers that are relevant for determining performance of the conference or the conference participants in accordance with some embodiments presented herein. Automated conference monitoring system 100 receives (at 502) a conference feed of an active or ongoing conference or of a conference that has completed and has not been summarized with context.

Automated conference monitoring system 100 obtains (at 504) the session information associated with the conference and/or the conference participants. Obtaining (at 504) the session information may include performing a lookup of the participant names, email addresses, and/or other identifying information to retrieve their voiceprints, determine their roles, and/or retrieve the customized taxonomy for determined roles.

Automated conference monitoring system 100 generates (at 506) the context-aware speech-to-text transcription of the audio stream using the obtained (at 504) session information. Automated conference monitoring system 100 selects (at 508) the appropriate contextual model from different contextual models that are generated for detecting the relevant context in conferences involving different departments, user roles, and/or deal states. The contextual model selection may also be based on the session information. For instance, automated conference monitoring system 100 determines the department, role, or other classification of the one or more representatives participating in the conference, and selects the contextual model that was generated for conferences involving the same department, role, or other classification and/or that models the relevant context for conferences involving the same department, role, or other classification. In some embodiments, the session information indicates that the conference is for a deal at an exploratory, demonstration, sales, support, or other state, and selects (at 508) the contextual model that contains the relevant context for a deal at the indicated state.

Automated conference monitoring system 100 analyzes (at 510) the conference stream and transcript using the selected (at 508) contextual model. Analyzing (at 510) the conference may include matching different snippets of the stream or transcript to different relevant context in the selected (at 508) contextual model. For instance, a first snippet of the conference audio may contain a set of voice characteristics that represent a happy or joyful sentiment, and a second snippet of the conference audio may contain voice characteristics and sentence structure that represent an open-ended question and may also contain words or phrases that represent a specific topic. The happy or joyful sentiment and the specific topic may correspond to relevant context within the selected (at 508) contextual model that is used to determine performance of representatives in the same department or with the same role as the representative participating in the conference, whereas the open-ended question is not relevant or is not used to determine performance of representatives in the same department or with the same role as the representative participating in the conference.

Automated conference monitoring system 100 tags (at 512) different snippets of audio from the conference and/or the corresponding text from the transcript that contain relevant context as defined within the selected (at 508) contextual model. The tagging (at 512) includes assigning or attributing contextual trackers to the different snippets. The contextual trackers may be linked to the audio snippets or text snippets, and may include identifiers that classify the context detected within the linked audio snippets or text snippets. Multiple contextual trackers may be linked or associated with a single snippet. In some embodiments, the contextual trackers are stored with the conference stream metadata.

Automated conference monitoring system 100 generates contextual reports that summarize the context detected throughout a conference based on the contextual trackers that are assigned to different segments or snippets of the conference. In other words, the contextual report for a particular conference presents the relevant context that was found or missing in the particular conference. A user is able to quickly classify the particular conference based on the presented context, isolate specific issues at targeted parts of the conferences based on the context, and perform actions to address the specific issues without having to listen to the audio or read the transcript.

Figure 6:
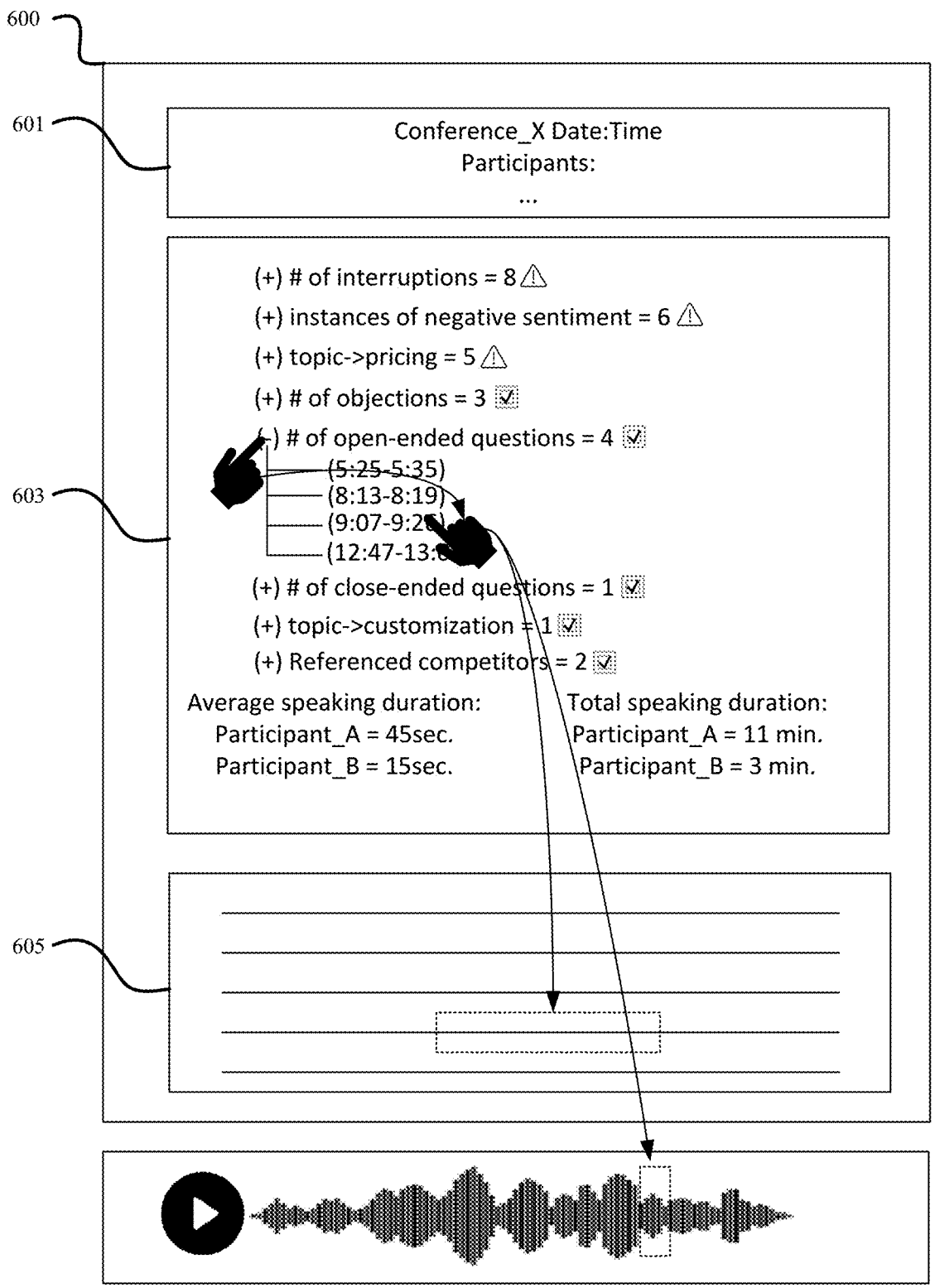
FIG. 6 illustrates an example of a contextual report that is generated for a conference in accordance with some embodiments presented herein.

FIG. 6 illustrates an example of a contextual report 600 that is generated for a conference in accordance with some embodiments presented herein. Contextual report 600 may include identifying information 601, contextual trackers 603, and transcript 605.

Identifying information 601 may include the names or identifiers about the represented conference or conferences, names or identifiers of the conference participants, and/or names or identifiers for the deal or deal state associated with the identified conference or conferences. Identifying information 601 may be obtained from the context-aware speech-to-text transcription of the conference or conferences and/or the session identifying information used for the context-aware speech-to-text transcription.

Each contextual tracker 603 is identified with a classifier. Each contextual tracker 603 may also include a visual indicator if the represented context is within an expected range, follows best practices, contributes to a successful engagement, is an anomalous value, deviates from best practices, and/or contributes to an unsuccessful engagement.

The classifier summarizes or presents the context associated with the contextual tracker 603. The classifier may include a key-value pair. The key identifies the context, and the value identifies a metric or measure for the identified context. For instance, the key-value pairs may present the number of open-ended questions that were asked, the number of interruptions, the average speaking duration, the total speaking time for each participant, the number of objections, the number of times different topics were discussed, and/or the duration of different sentiment. Other contextual trackers 603 may enumerate the topics that were discussed, the sentiment expressed during different conference segments, the referenced competitors or competitor products, the conference outcome, and/or other summarization for the actions and/or behaviors expressed during the conference.

Contextual trackers 603 may be arranged based on relevance. The relevance may be determined from the contextual model that was selected for the represented conference based on the identified department or roles associated with the conference participants or the deal state. In some embodiments, contextual trackers 603 may also be arranged based on their values. For instance, a first contextual tracker representing an abnormal number of interruptions may be presented before a second contextual tracker representing an expected or desired sentiment. Accordingly, the same contextual trackers 603 may be presented with a different order in different contextual reports 600 based on the severity or the values for the context represented by contextual trackers 603.

Each contextual tracker 603 may correspond to a selectable and/or expandable user interface element. A user interaction with a particular contextual tracker 603 may expand the particular contextual tracker 603 to present individual instances of the represented context and/or the conference segments where the individual instance of the represented context was detected. For instance, a user may select the contextual tracker 603 that represents the number of questions that were asked by a particular speaker. In response, automated conference monitoring system 100 expands that contextual tracker 603 within contextual report 600 to present contextual trackers 603 for each asked question and/or the position within the conference where that question was asked.

User interactions with contextual trackers 603 may also be used to access the conference segments where the represented context is detected and/or the portion of transcript 605 containing the text for the represented context. For instance, a user may select contextual tracker 603 for a particular question, and automated conference monitoring system 100 may playback the conference segment that is linked to the selected contextual tracker 603 or may highlight and/or select the text for the particular question in transcript 605.

Transcript 605 presents the text for the conference dialog. Different sections of transcript 605 may be linked to different contextual trackers 603 that classify the context detected in those sections. Transcript 605 may also be linked to the conference audio and/or video streams. Accordingly, a selected set of text may be linked to the conference segment from which the selected set of text was transcribed.

In some embodiments, automated conference monitoring system 100 changes the content and format of contextual report 600 based on the target audience for that contextual report 600. Changing the content and format of contextual report 600 may include prioritizing the presentation of a first set of relevant context for a first manager that primarily uses or references that first set of relevant context to gauge performance of their team members, and prioritizing the presentation of a different second set of relevant context for a second manager that primarily uses or references that second set of relevant context to gauge performance of their team members.

In some embodiments, automated conference monitoring system 100 determines the target audience based on the departments and/or roles of the conference participants and/or a state associated with the conference subject matter. In some embodiments, automated conference monitoring system 100 determines the target audience based on the departments and/or roles associated with a user requesting access to contextual report 600.

In some embodiments, the state may be determined from the departments and/or roles of the conference participants. For instance, if the conference participants include sales representatives, then the state may correspond to a sales call, and if the conference participants include support representatives, then the state may correspond to a support call. Accordingly, automated conference monitoring system 100 customizes contextual reports 600 based on the departments and/or roles of the representatives requesting contextual reports 600 for a particular deal, and presents the detected context that representatives in the identified departments and/or roles commonly access or use.

In some embodiments, the state may be determined based on the tracked progression of a deal or task. For instance, each deal may go through an introductory or exploratory state, demonstration state, customization state, negotiation state, and deployment state. Each state may involve a different conference or engagement with customer personnel by different entity representatives. Automated conference monitoring system 100 may track the state of a deal with a particular customer by retaining the conference records and context associated with each state, and by continually building or adding to the contextual summary with new data or context that is obtained at each state.

Each state may be associated with different goals and objectives and may have different context that is relevant to that state or the representatives involved with that state or a next state in the tracked progression. Accordingly, automated conference monitoring system 100 customizes contextual reports 600 to provide the context that is determined to be relevant for each state or next state of a deal. For instance, the representatives preparing to perform the demonstration may use a first set of context from the introductory or exploratory conference to target the demonstration and present the customer with specific products or features that were determined to be of interest to the customer during the introductory or exploratory conference, and the representatives customizing the product may use a second set of context from the demonstration conference to target the product or feature customizations based on specific interests or needs that the customer identified in the demonstration conference.

Figure 7:
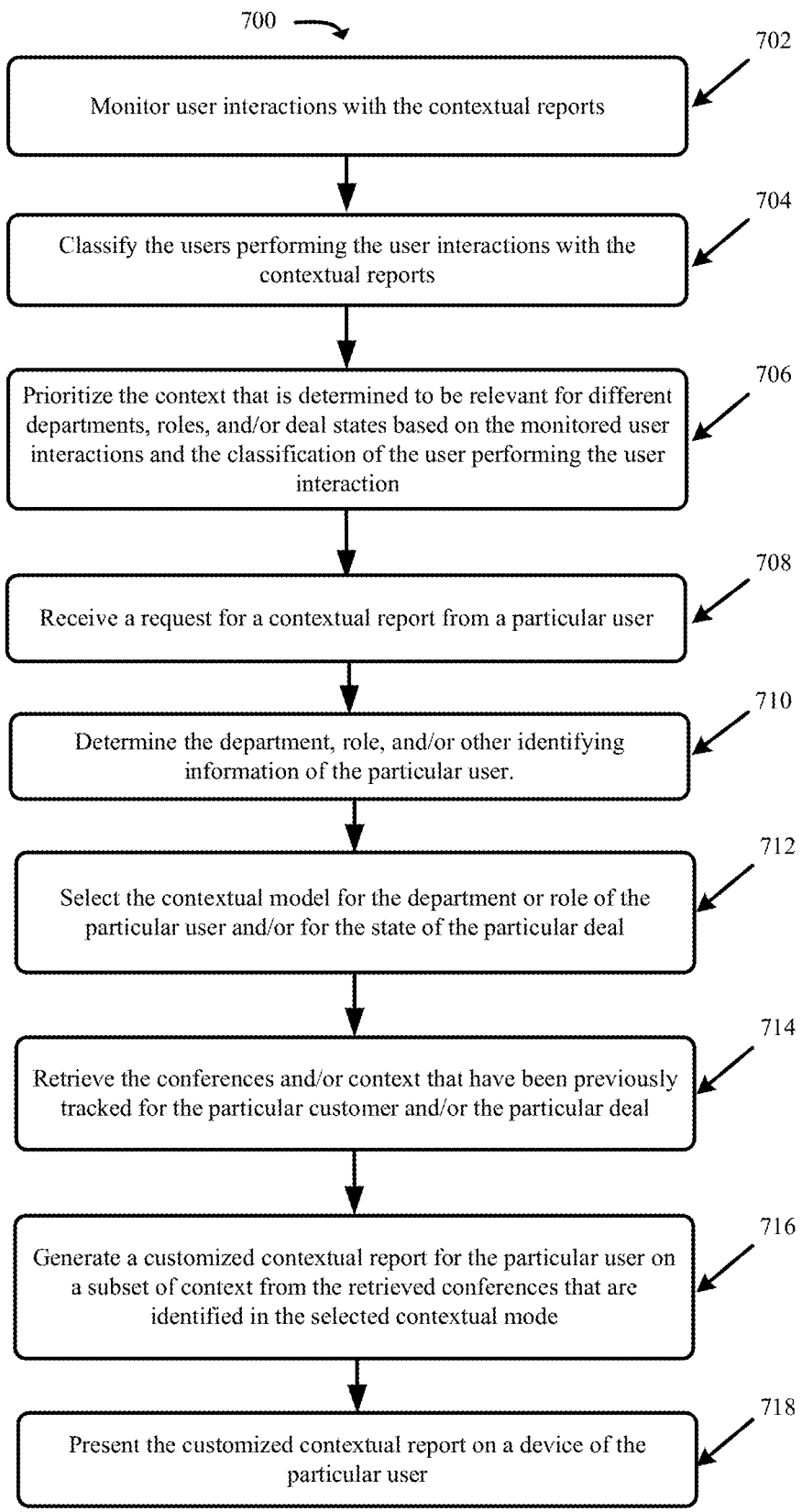
FIG. 7 presents a process for generating a customized contextual report in accordance with some embodiments presented herein.

FIG. 7 presents a process 700 for generating the customized contextual reports in accordance with some embodiments presented herein. Process 700 is implemented by automated conference monitoring system 100.

Process 700 includes monitoring (at 702) user interactions with contextual reports 600. Monitoring (at 702) the user interactions may include tracking the context within each report 600 that is clicked, selected, or otherwise accessed by the different users that request and view contextual reports 600. The users may include managers that are responsible for the performance of their respective teams or departments, representatives in different departments or roles that use the information within contextual reports 600 to improve the effectiveness of their interactions with a customer, and/or agents of an entity that collaborate with other agents in performing different states of a deal.

Process 700 includes classifying (at 704) the users performing the user interactions with contextual reports 600. Automated conference monitoring system 100 classifies (at 704) the users based on the departments, roles, and/or other identifying information associated with each user. The classification (at 704) includes determining the percentage of users in a particular department or with a particular role that interact with different context that is presented in contextual reports 600. For instance, automated conference monitoring system 100 may determine that 70% of managers for a sales team access the context that indicates whether an open-ended question was asked in a conference, and may determine that 80% of representatives that perform product demonstrations access the context for identifying the discussed topics, products, or services during prior conferences or conversations with a customer.

In some embodiments, the classification (at 704) includes determining the state of a deal when users interact with different context in the contextual summaries. For instance, user interactions by sales representatives may indicate that the deal is in a sales state, or user interactions with the contextual summaries generated for a particular customer at a first time may indicate that the deal involving the particular customer is at a first state and user interactions with contextual reports 600 generated for the particular customer at a second time may indicate that the deal involving the particular customer is at a second state.

Process 700 includes prioritizing (at 706) the context that is determined to be relevant for different departments, roles, and/or deal states based on the monitored (at 702) user interactions and the classification (at 704) of the user performing the user interaction. The prioritization may include modifying the contextual models based on the changing frequencies or patterns with which related groups of users (e.g., users with a common classification) access different subsets of context within the contextual summaries. For instance, automated conference monitoring system 100 may determine that sales representatives (e.g., a particular related group of users) stop accessing context associated with a first product, and begin accessing context associated with a second product. Accordingly, automated conference monitoring system 100 changes the contextual model for the sales representatives to prioritize the context associated with the second product over the context associated with the first product. The prioritization (at 706) may also include attributing a weight to the different context within each contextual model. The weight determines the order with which the context detected within a particular conference is arranged and/or presented in contextual report 600.

Process 700 includes receiving (at 708) a request for contextual report 600 from a particular user. The request may specify a particular deal and/or a particular customer that the particular user wishes to receive additional information about as part of advancing the particular deal, monitoring interactions that team members of the particular user have had with the particular customer, and/or for monitoring the particular deal.

Process 700 includes determining (at 710) the department, role, and/or other identifying information of the particular user. In some embodiments, automated conference monitoring system 100 has access to an employee database, and uses an identifier (e.g., name, email account, etc.) to lookup the identifying information of the particular user. In some other embodiments, the identifying information is provided with the request or is associated with the request based on an authenticated account that the particular user uses to issue the request.

Process 700 includes selecting (at 712) the contextual model for the department or role of the particular user and/or for the state of the particular deal. The contextual model includes a prioritized ordering or weighting of the relevant subset of context that other users in the same department, in the same role, and/or at the same state of a deal most frequently access and/or interact with.

Process 700 includes retrieving (at 714) the conferences and/or context that have been previously tracked for the particular customer and/or the particular deal. In some embodiments, automated conference monitoring system 100 stores the different conferences that different agents have had with the particular customer, involve the particular deal, and the context that is generated for those conferences in a database, repository, or other storage, and retrieves (at 714) the stored data based on one or more identifiers in the user request that identify the particular customer and/or the particular deal.

Process 700 includes generating (at 716) a customized contextual report 600 for the particular user on a subset of context from the retrieved (at 714) conferences that are identified in the selected (at 712) contextual model. Generating (at 716) the customized contextual report 600 includes prioritizing the context that is determined in the contextual model to be of most relevance for the particular user's department or role and/or for the current state of the particular deal. Other context may be excluded from the customized contextual report 600 and/or presented after the prioritized context. In this manner, automated conference monitoring system 100 customizes contextual reports 600 that are presented to each user to prevent informational overload and to provide a curated list context that is most relevant to each user and the task that the user performs relative to the particular deal. More specifically, automated conference monitoring system 100 generates contextual reports 600 that present different subsets of context to a sale representative, than to a manager of the sales team, than to an agent tasked with providing product demonstrations, than to an agent in the finance team, than to an agent in a support role, than to agents handling other states of the particular deal.

Process 700 includes presenting (at 718) the customized contextual report 600 on a device of the particular user in response to the received (at 708) request. The customized contextual report 600 has an interactive and/or expandable structure. For instance, selecting a first context in the customized contextual report 600 may present the transcript from the one or more segments of one or more conferences where the first context is detected, and/or the audio of the one or more segments. In some embodiments, the first context expands to present sub-context that is associated with the first context. For instance, the topics discussed in the one or more conferences may be stored under the first context. Accordingly, a user interaction with the first context reveals different sub-context for each of the discussed topics, and a user interaction with a particular sub-context accesses the segments in the one or more conferences where the topic associated with the particular sub-context is discussed.

Automated conference monitoring system 100 may also generate aggregate contextual reports in response to user queries for custom sets of context. The aggregate contextual reports may be generated from the context that is tagged to different conferences involving different customers, agents in different departments or with different roles, different deals, and/or different states of one or more deals. For instance, a user may request an aggregate contextual report for all deals involving a particular product. In this instance, automated conference monitoring system 100 generates the aggregate contextual report using the context that is tagged to different conferences that were generated for different deals involving the particular product. Alternatively, a user may request an aggregate contextual report for completed deals of the particular product in which a discount was offered without the customer requesting the discount. In this instance, automated conference monitoring system 100 analyzes the context that is tagged to the different conferences that were generated for the different deals involving the particular product, and generates the aggregate contextual report from the subset of conferences that are tagged with context indicating that a discount was offered and that the customer did not request the discount.

Figure 8:
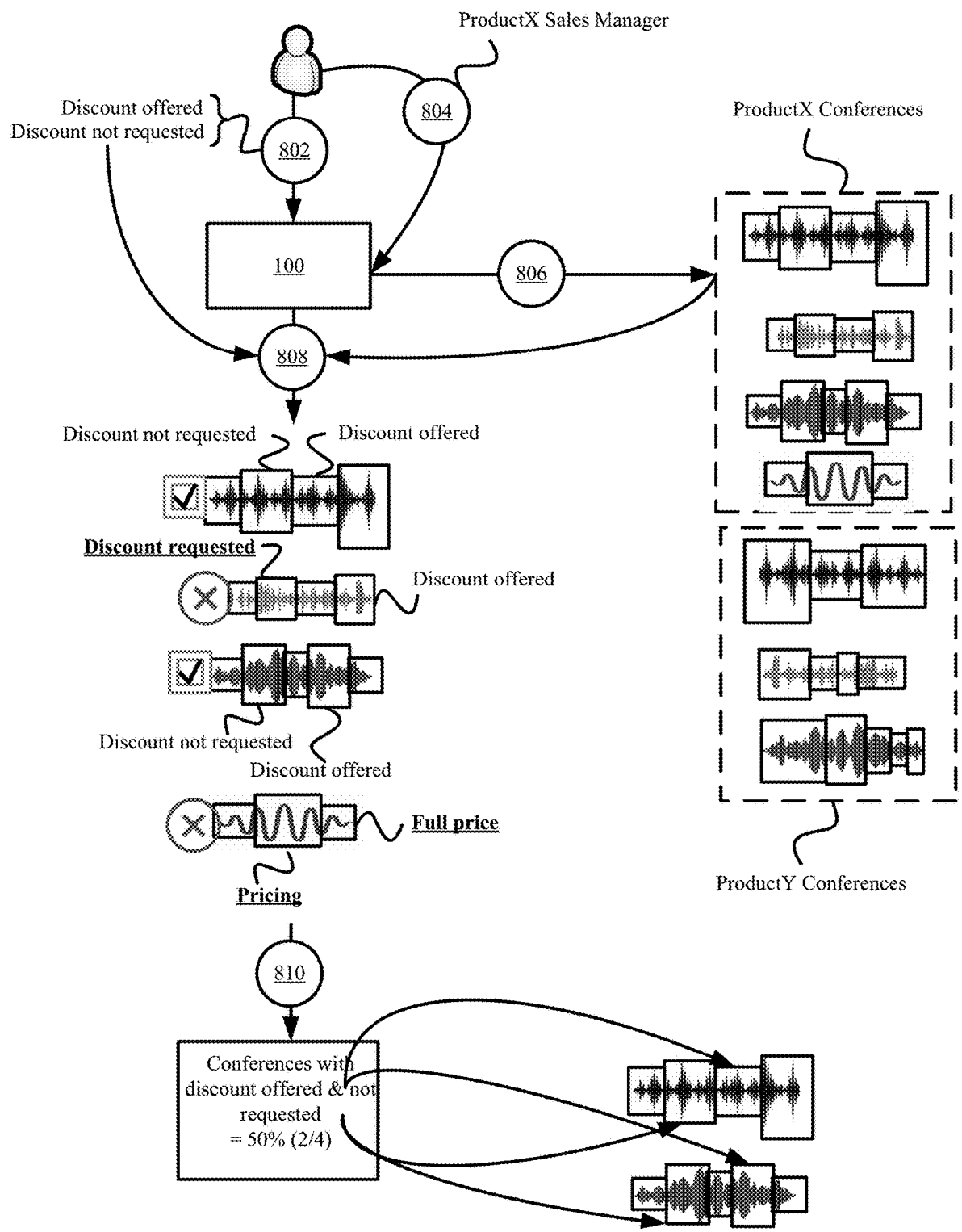
FIG. 8 illustrates an example of generating an aggregate contextual report in accordance with some embodiments presented herein.

FIG. 8 illustrates an example of generating an aggregate contextual report in accordance with some embodiments presented herein. Automated conference monitoring system 100 receives (at 802) a user request for a particular aggregate contextual report. The user request may include a query. The query may specify different context (e.g., contextual trackers 603 or contextual identifiers for the desired context) to include as part of the particular aggregate contextual summary.

Automated conference monitoring system 100 may confine the query to conferences that the requesting user has access to. Accordingly, automated conference monitoring system 100 determines (at 804) access credentials of the user issuing the request, and selects (at 806) a set of contextually tagged conferences that the requesting user is authorized to access based on the determined (at 804) access credentials. The access credentials may be linked to the department or role of the user. For instance, a sales representative may have access to the conferences they participated in, a sales manager for a particular product may have access to the conferences that any member of their team participated in and/or that are related to the particular product, and a general sales manager or executive may have access to the conferences related to all products.

Automated conference monitoring system 100 searches (at 808) the selected (at 806) set of contextually tagged conferences for the requested context. The searching (at 808) involves selecting a subset of the set of contextually tagged conferences that are tagged with the context from the user request, and that having matching values or values within a threshold of the context from the user request. For instance, the user request may be for a particular aggregate contextual report of conferences in which a discount was offered without the customer asking for it. Some of the tagged conferences may include context that indicates that the discount was offered. However, a first subset of the tagged conferences may include additional context that indicates that the customers requested the discount, and a second subset of the tagged conference include additional context that indicates that the customers did not request the discount.

Automated conference monitoring system 100 generates (at 810) the particular aggregate contextual report based on the subset of tagged conferences that satisfy or include the different context from the user request. Generating (at 810) the particular aggregate contextual report includes providing contextual identifiers that link to different segments from the subset of tagged conferences where the queried for context is detected. In other words, each contextual identifier may have a one-to-many relationship in which a single context is linked to segments from multiple conferences. Generating (at 810) the particular aggregate contextual report may further include deriving metrics based on the frequency with which the queried for context is detected in all conferences and/or the selected set of contextually tagged conferences.

In some embodiments, automated conference monitoring system 100 automatically generates the aggregate contextual reports for users with different oversight roles relating to product performance and/or team performance. For instance, automated conference monitoring system 100 may produce aggregate contextual reports for managers. The aggregate contextual reports provide the manager with summarized context for their team members and/or the conferences conducted by their team members. Moreover, the summarized context is prioritized according to tracked preferences of the manager. For instance, a first manager may use average talk duration as a primary indicator of a representative's performance, and a second manager may use a number of interruption as a primary indicator of a representative's performance. The aggregate contextual report that is generated for the first manager may have the same relevant context presented as the aggregate contextual report that is generated for the second manager but in a different order and/or with different contextual trackers 603 prioritized in the report. Each manager may drill down within the aggregate contextual report to identify strengths and weaknesses of individual team members and/or identify areas where the team or individual team members are performing above or below expectations.

In some embodiments, automated conference monitoring system 100 may generate the aggregate contextual reports with a default and/or shared set of contextual data. For instance, automated conference monitoring system 100 generates aggregate contextual reports for each manager with each aggregate contextual report presenting the same set of context from the conferences involving that manager's team members.

Each manager may interact with the aggregate contextual report to isolate the context that is associated with conferences of a particular team member or to compare the context that is associated with the conferences of the particular team member to the context that is associated with the conferences of other team members. The interactions may include selecting a user interface element that identifies specific aggregated context to expand that user interface element and present the individual instances of that context and the conferences of the individual team members from which the specific aggregated context is generated. The interactions may also include queries. For instance, the manager may define a query to organize individual instances of aggregated context based on individual team members associated with those individual instances of the aggregated context. Automated conference monitoring system executes the query, and modifies the presentation dashboard of the aggregate contextual report to present the query results.

In some embodiments, automated conference monitoring system 100 uses AI/ML techniques to evaluate the aggregate contextual reports, and generate actionable data based on the evaluation. The AI/ML techniques may determine contextual trends or patterns within the aggregate contextual reports that contribute to desired or undesired outcomes or engagements, and may develop performance optimization models based on the determined contextual trends or patterns. The performance optimization models may provide actionable data for isolating conferences that require managerial oversight, identifying strengths and weaknesses of team members, and/or deriving best practices for improving the overall effectiveness of the team. For instance, the AI/ML techniques may evaluate the aggregate contextual reports, and may determine a contextual trend or pattern in which offering a specific type of discount in relation to a particular offering increased sales of the particular offering by 100%. Automated conference monitoring system 100 may then define actionable data and/or perform an automated action in which the specific type of discount is always offered in sales discussions involving the particular offering. The actionable data may include modifying scripts followed by the sales agents to offer the specific type of discount after a set of conditions or context are identified in a conversation and/or modifying the pricing of the particular offering to include the discount.

Figure 9:
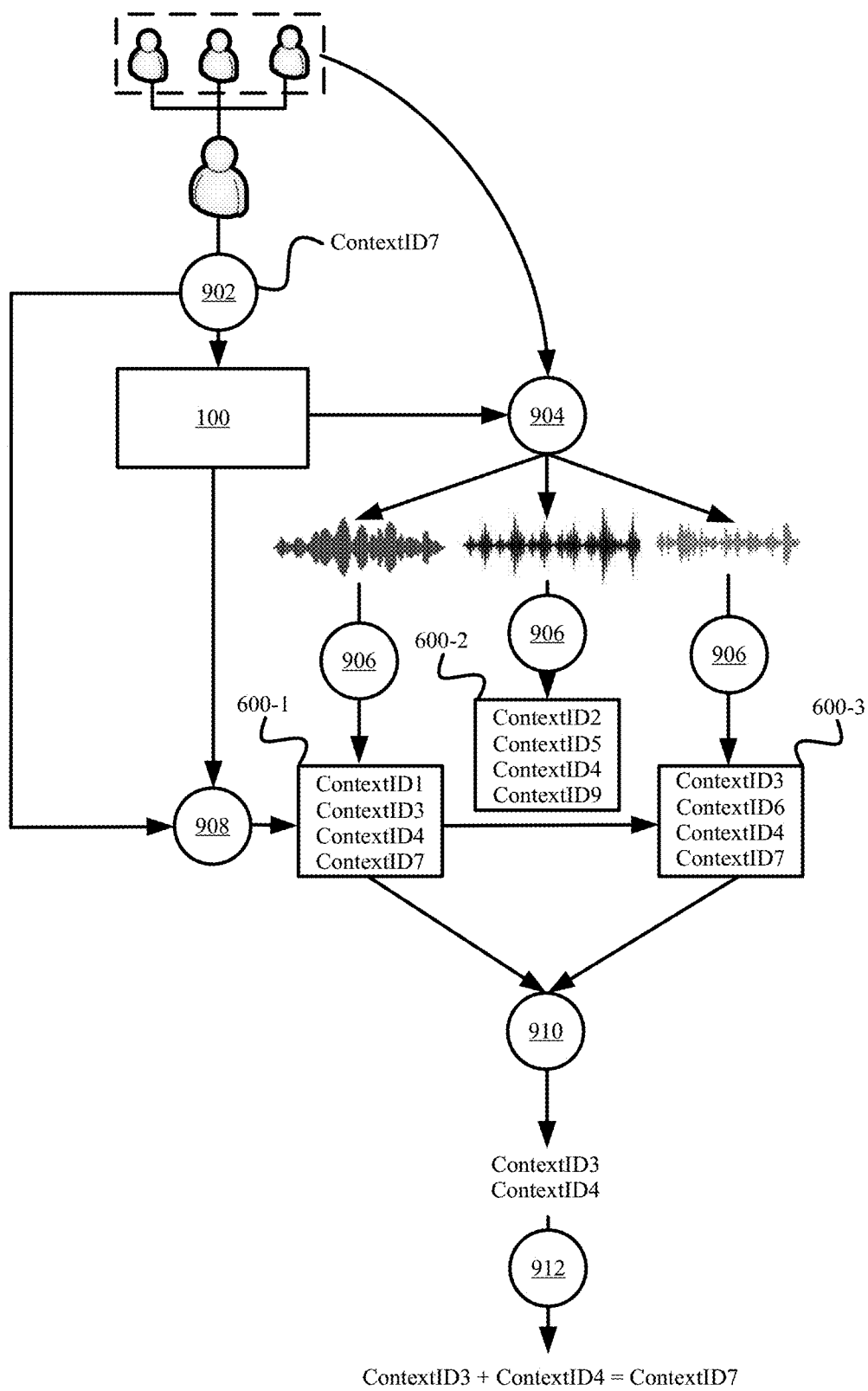
FIG. 9 illustrates an example of generating a performance optimization model for directing managerial oversight in accordance with some embodiments presented herein.

FIG. 9 illustrates an example of generating a performance optimization model for directing managerial oversight in accordance with some embodiments presented herein. Automated conference monitoring system 100 is configured (at 902) with criteria. The criteria may differentiate between a positive or successful engagement and a negative or unsuccessful engagement in conferences or conversations that members of a team have with different customers. For instance, the criteria for the positive or successful engagement may specify a particular contextual tracker 603 that is related to the completion of a sale, scheduling a product demonstration, receiving permission to follow-up with a customer, providing additional product information at the conclusion of a call, etc. The criteria may be defined by a manager, executive, and/or another entity with an oversight role. The criteria for the negative or unsuccessful engagement may specify a particular contextual tracker 603 that is related to a customer requesting to be removed from a calling list, a customer declining a product demonstration, a customer expressing a disinterested or bored sentiment, etc.

Automated conference monitoring system 100 retrieves (at 904) the calls, conferences, and/or conversations that members of a particular team have had with different customers. Automated conference monitoring system 100 performs the contextual classification of each conversation, and generates (at 906) contextual reports 600-1, 600-2, and 600-3 with the relevant context that is detected in the conversations.

Automated conference monitoring system 100 selects (at 908) contextual reports 600-1 and 600-3 for a set of conferences that satisfy the configured (at 902) criteria. For instance, automated conference monitoring system 100 selects (at 908) contextual reports 600-1 and 600-3 with the particular context that satisfies the criteria for a positive or successful engagement or a negative or unsuccessful engagement.

Automated conference monitoring system 100 uses one or more AI/ML techniques to analyze the selected contextual summaries, and to determine (at 910) common contextual trends or patterns that exist with a certain frequency in the context of the selected contextual reports 600-1 and 600-3 and that do not exist with the same certain frequency in the context of the unselected contextual report 600-2. The contextual trends or patterns identify the set of context that is determined to contribute to the particular context defined as the criteria. For instance, if the criteria identifies conferences with a negative or unsuccessful engagement using the particular context, the contextual trends or patterns identify other context in the conferences that produced or contributed to the negative or unsuccessful engagement.

Automated conference monitoring system 100 defines (at 912) a performance optimization model based on the set of context and/or the determined common contextual trends or patterns. A performance optimization model that is generated based on criteria for a negative or unsuccessful engagement identifies contextual trackers 603 that contributed to the negative or unsuccessful engagement and that should be avoided in future conversation. More specifically, the performance optimization model may be used for training or coaching purposes to objectively identify the actions, behaviors, and/or other activity that commonly cause the negative or unsuccessful engagement, and may be used to prioritize active calls that a manager listens on or assist with.

Figure 10:
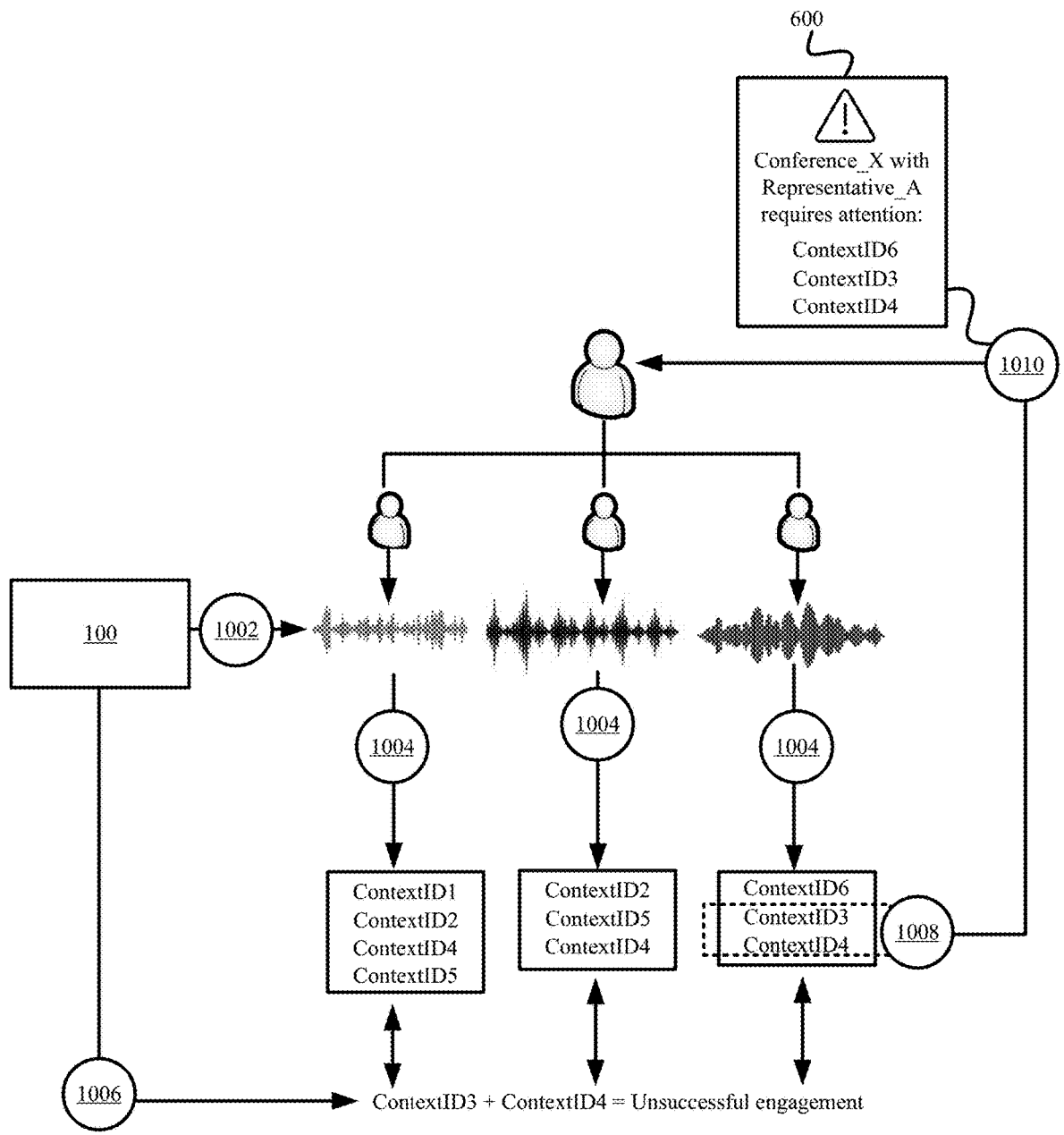
FIG. 10 illustrates an example of generating actionable data based on the application of a performance optimization model to a set of active conferences in accordance with some embodiments presented herein.

FIG. 10 illustrates an example of generating actionable data based on the application of a performance optimization model to a set of active conferences in accordance with some embodiments presented herein. Automated conference monitoring system 100 monitors (at 1002) a set of ongoing or active conversations on behalf of a manager. The manager may be responsible for the performance of team members that participate in tens or hundreds of conversations with different customers. The manager is unable to listen to every conversation. Moreover, the manager may be tasked with assisting the team members when specific issues arise in certain calls, and therefore does not have time to monitor individual contextual reports 600 to identify when those specific issues arise or which calls require the team manager's attention.

Automated conference monitoring system 100 classifies (at 1004) different segments of the set of ongoing or active conversations with relevant context from a contextual model that is defined for the department, roles, or types of deals handled by the team members. Automated conference monitoring system 100 compares (at 1006) the detected context to the performance optimization model that is generated for the team based on criteria is defined for evaluating the performance of the team. In this example, the performance optimization model identifies the contextual pattern that leads to a negative or unsuccessful engagement.

Automated conference monitoring system 100 detects (at 1008) that contextual trackers 603 assigned to a particular conference match the contextual pattern from the performance optimization model for the negative or unsuccessful engagement. Rather than present the detected context and/or contextual reports 600 for all of the set of ongoing or active conversations to the manager, automated conference monitoring system 100 selectively generates and/or presents (at 1010) the context or contextual report 600 for the particular conference to the manager. In some embodiments, automated conference monitoring system 100 presents (at 1010) contextual report 600 for the particular conference in response to detecting the contextual pattern from the performance optimization model and while the particular conference remains active. Accordingly, automated conference monitoring system 100 provides a real-time identification of the conversations that contain contextual elements of an unsuccessful engagement to the manager as they manifest.

The manager may review the automatically selected contextual report 600 to determine if assistance is needed. The manager may connect to and/or listen in on the active conversation associated with the automatically selected contextual report 600, and/or may communicate directly with the team member that is participating in that conference. For instance, the team manager may provide alerts or notifications to the device of the team member that advise the team member on a different course of action.

In some embodiments, automated conference monitoring system 100 performs automated actions based on the context of a particular conference matching the contextual pattern of a performance optimization model. For instance, automated conference monitoring system 100 may automatically connect the manager to the particular conference with the contextual pattern for a negative or unsuccessful engagement, and may present the detected context for the particular conference on a device of the manager so that the manager may become familiar with what previously transpired in the particular conference without having to read the transcript or listen to the earlier parts of the particular conference.

Automated conference monitoring system 100 may also generate coaching models that are customized for each team member. The coaching models provide objective and corroborating evidence for the weaknesses or performance deficiencies of individual team members during performance reviews or coaching sessions.

Figure 11:
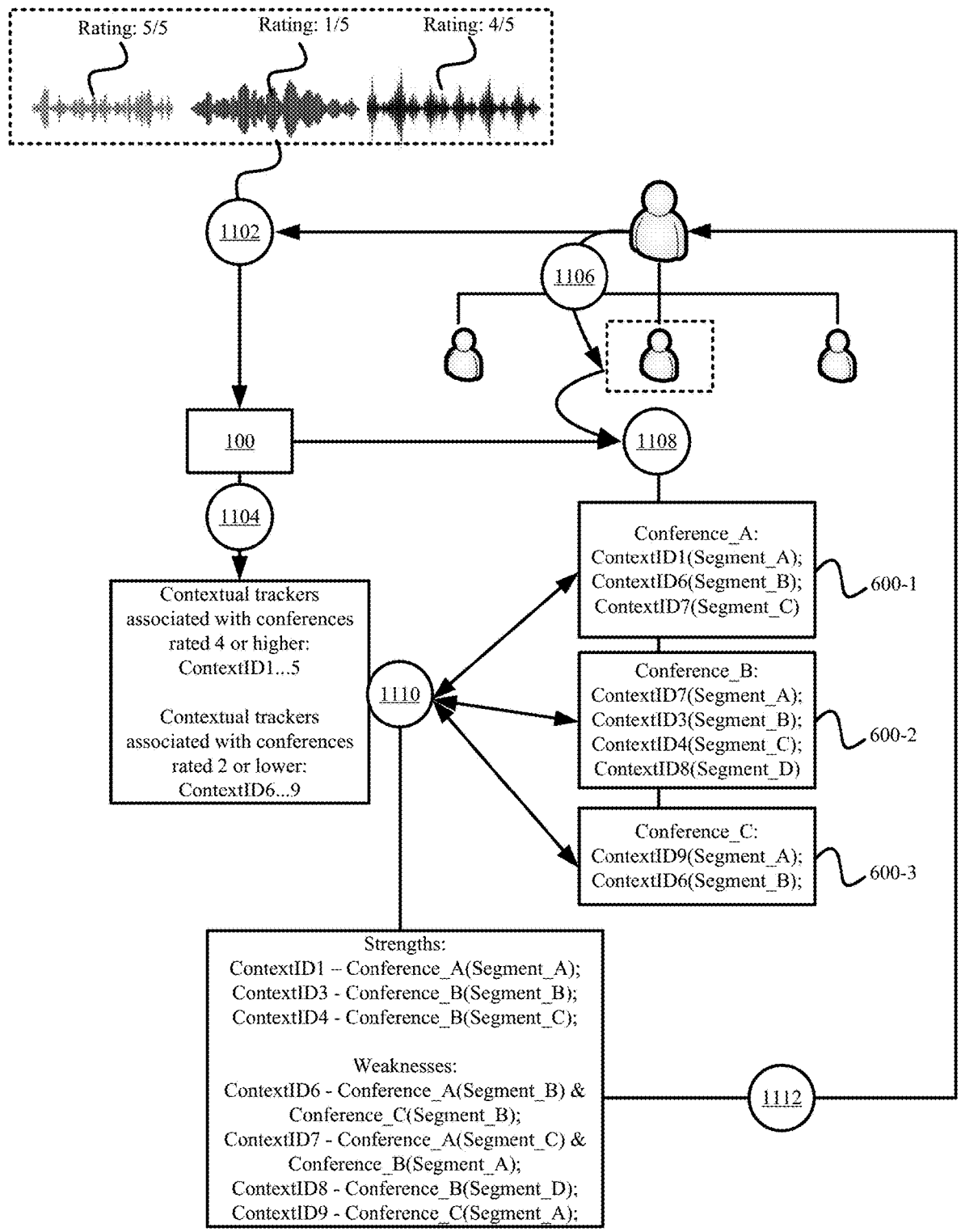
FIG. 11 illustrates an example of generating coaching models in accordance with some embodiments presented herein.

FIG. 11 illustrates an example of generating coaching models in accordance with some embodiments presented herein. A team manager selects and provides (at 1102) a recorded set of conversations to automated conference monitoring system 100. The team manager may rate or score the conversations based on how closely the conversations adhere to desired best practices or desired behavioral paradigms, or based on the outcomes of each conversation. The team manager may also manually define criteria for desired best practices or behavioral paradigms, and/or select contextual trackers 603 that are associated with the best practices or desired behavioral paradigms. Accordingly, the recorded set of conversations may include examples of best practices or desired behavioral paradigms that team members should replicate or examples of undesired practices or behavioral paradigms that team members should avoid.

Automated conference monitoring system 100 uses one or more AI/ML techniques to analyze the recorded set of conversations, determine common contextual trends or patterns that exist with a certain frequency amongst the recorded set of conversations with a common rating, score, or classification, and generate (at 1104) a coaching model based on the common contextual trends or patterns, defined criteria, and/or manager-selected contextual trackers 603. In this manner, automated conference monitoring system 100 generates coaching models that are customized according to preferences of each manager. The coaching model may include a set of contextual trackers 603 for common context associated with best practices or desired behavioral paradigms or common context associated with undesired practices or behavioral paradigms.

Automated conference monitoring system 100 receives (at 1106) a request from the team manager that identifies a particular team member that is the subject for a performance review or coaching. Automated conference monitoring system 100 retrieves (at 1108) contextual reports 600-1, 600-2, and 600-3 that were generated from conferences and/or conversations involving the particular team member. In some embodiments, automated conference monitoring system 100 may filter the retrieved (at 1108) contextual reports 600-1, 600-2, and 600-3 to retain contextual trackers 603 that were tagged to the segments in which the particular team member was speaking. In some other embodiments, automated conference monitoring system 100 may retain the complete contextual reports 600-1, 600-2, and 600-3 as contextual trackers 603 for the reactions of other participants may be helpful in deciphering whether the particular team member followed or adhered to the best practices or desired behavioral paradigms.

Automated conference monitoring system 100 compares (at 1110) contextual trackers 603 of the retrieved (at 1108) contextual reports 600-1, 600-2, and 600-3 to the coaching model. Automated conference monitoring system 100 identifies a set of contextual trackers 603 from the retrieved (at 1108) contextual reports 600-1, 600-2, and 600-3 that deviate from contextual trackers 603 representing the best practices or desired behavioral paradigms in the coaching model or that match contextual trackers 603 representing undesired practices or undesired behavioral paradigms in the coaching model. Moreover, automated conference monitoring system 100 identifies the conference segments that are linked to the identified set of contextual trackers 603 as objective evidence of where the best practices were violated or the desired behavioral paradigm was not followed.

Automated conference monitoring system 100 may highlight or otherwise differentiate the identified set of contextual trackers 603 in contextual reports 600-1, 600-2, and 600-3, and may provide (at 1112) the team manager with actionable data based on the identified set of contextual trackers 603. Alternatively, automated conference monitoring system 100 may generate a customized contextual report 600 for the particular team member. The customized contextual report 600 may include the identified set of contextual trackers 603 with links to the associated conference segments. The team manager may reference the identified set of contextual trackers 603 to identify areas that the particular team member is weak, to provide explicit examples where the particular team member deviated from best practices, and/or to give examples of where the particular team member may improve their performance. For instance, the customized contextual report 600 may indicate that the particular team member does not properly engage customers, and may provide examples from different conferences in which the particular team member interrupts the customer, speaks uninterrupted for a long duration, and/or does not ask personal questions or asks close-ended questions that do not permit the customer an opportunity to properly respond. The actionable data may include segments from other conferences that provide examples of best practices or desired behavior for the identified set of contextual trackers 603.

Accordingly, the performance optimization models, coaching models, and/or other models created by automated conference monitoring system 100 may include actionable data or actionable items for recipients of contextual reports 600 or models to perform. In some embodiments, automated conference monitoring system 100 automatically performs one or more automated actions based on contextual trackers 603 within different individual or aggregate contextual reports and/or models created by automated conference monitoring system 100.

The automated actions may include automatically generating a script and/or content for presentation during active conferences or future conferences, automatically generating content on behalf of an agent to follow-up with a customer (e.g., schedule a follow-up meeting, send a thank you email, etc.), automatically populating Customer Relationship Management ("CRM") systems with context and/or data detected from the automatic conference monitoring, providing an interactive chatbot that assumes the roles of different representatives or agents in conferences with customers and/or engages the customers according to a modeled set of best practices or desired behavioral paradigms, providing an interactive chatbot that trains or coaches human actors on modeled best practices or desired behavior paradigms, and/or providing an interactive chatbot that assumes the role of a team manager and performs performance reviews based on the generated coaching models.

Figure 12:
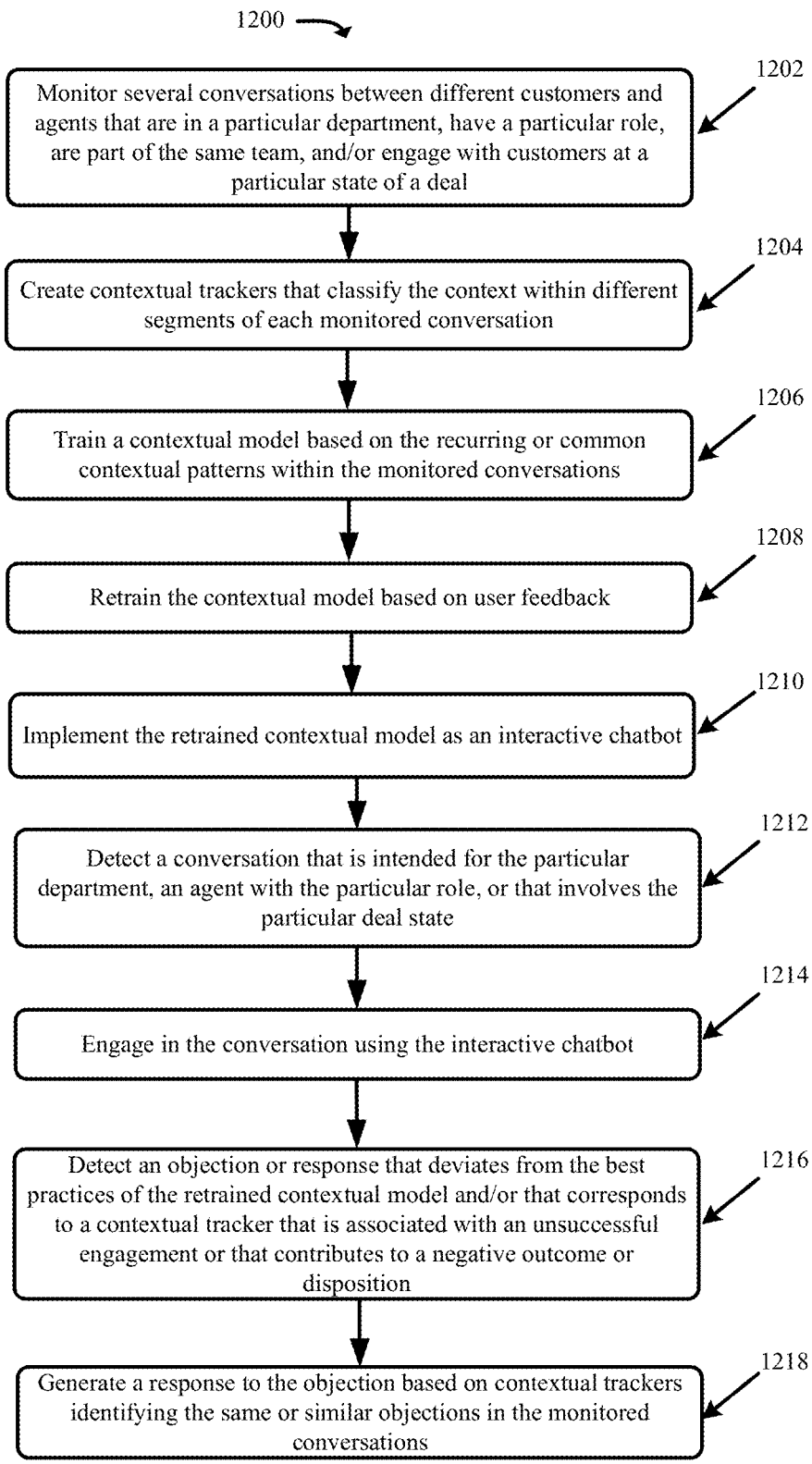
FIG. 12 presents a process for automating interactions with customers based on a contextual modeling of best practices and/or desired behavior paradigms in accordance with some embodiments presented herein.

FIG. 12 presents a process 1200 for automating interactions with customers based on a contextual modeling of best practices and/or desired behavior paradigms in accordance with some embodiments presented herein. Process 1200 is implemented by automated conference monitoring system 100, and more specifically, by controller 109 of automated conference monitoring system 100.

Process 1200 includes monitoring (at 1202) several conversations between different customers and agents that are in a particular department, have a particular role, are part of the same team, and/or engage with customers at a particular state of a deal. Monitoring (at 1202) the conversations may include receiving and analyzing the audio and/or video streams associated with each conversation, and/or transcribing the dialog from each conversation.

Process 1200 includes creating (at 1204) contextual trackers 603 that classify the context within different segments of each monitored conversation. For instance, the context may classify the activity, events, and/or behaviors that are detected in each segment.

Process 1200 includes training (at 1206) a contextual model based on the recurring or common contextual patterns or trends within the monitored conversations. The contextual model includes contextual trackers 603 that are determined to be most relevant to the particular department, particular role, team, or particular deal state, and therefore have the greatest influence on the outcome of the conversations. The contextual trackers 603 may be differentiated according to the conversation outcomes. For instance, training (at 1206) the contextual model may include determining a first set of contextual trackers 603 for context that is detected in conversations with positive or successful outcomes, and a second set of contextual trackers 603 for context that is detected in conversations with negative or unsuccessful outcomes. Training (at 1206) the contextual model may further include deriving the context that is associated with best practices or desired behavioral paradigms for the particular department or for the particular role, team, or deal state by comparing the first set of contextual trackers 603 to the second set of contextual trackers 603.

Process 1200 includes retraining (at 1208) the contextual model based on user feedback. The user feedback may be obtained from managers or other users, and is used to customize the contextual model according to the preferences of the managers or users. Retraining (at 1208) the contextual model includes adjusting the relevance attributed to one or more of the contextual trackers 603 in the contextual model based on the feedback, removing contextual trackers 603 that are identified as irrelevant in the feedback, and/or adding new contextual trackers 603 that are identified as relevant in the feedback and that are not included in the contextual model. The user feedback may be used to refine the context that is associated with the best practices or the desired behavioral paradigms.

Process 1200 includes implementing (at 1210) the retrained contextual model as an interactive chatbot. Implementing (at 1210) the retrained contextual model may include configuring or defining the actions of the interactive chatbot according to the best practices, desired behavioral paradigms, and/or other context from the retrained contextual model. For instance, the retrained contextual model may include contextual trackers 603 for an ordered list of topics that controls the conversational flow or dialog that the interactive chatbot generates in a conference with a customer. The ordered list of topics may be defined based on a pattern or trend with which contextual trackers 603 representing topics of conversations are detected in the monitored conversations having the positive or successful outcomes. The retrained contextual model may include contextual trackers 103 that are used to control the energy, sentiment, tone, talking duration, attitude, and/or other speech behaviors of the interactive chatbot. For instance, training (at 1206) and retraining (at 1208) the contextual model may include identifying that a personal greeting, calm demeanor, positive sentiment, and short average talking durations followed by a particular type of question are common contextual trackers 603 of the monitored conversations that led to converted sales, and no greeting, an agitated or hurried demeanor, negative or unenthusiastic sentiment, and long average taking durations followed with minimal time for the customer to respond are common contextual trackers 603 of the monitored conversation that led to unconverted sales. Implementing (at 1210) the retrained contextual model therefore includes configuring the behavioral characteristics of the interactive chatbot based on the common context detected within the monitored conversations that resulted in the positive or successful outcomes.

Process 1200 includes detecting (at 1212) a conversation that is intended for the particular department, an agent with the particular role, or that involves the particular deal state. For instance, controller 109 may be tasked with contacting a set of customers with deals at the particular deal state, or may receive a call from a customer that routes to the particular department.

Process 1200 includes engaging (at 1214) in the conversation using the interactive chatbot that implements the retrained contextual model. The interactive chatbot may automatically generate speech to simulate the voice of an agent, or text to simulate the words of the agent. The speech may be dynamically generated according to the best practices and/or desired behavioral paradigms from the retrained contextual model and responses provided by the customer or other third-parties engaged in the conversation. In other words, the interactive chatbot generates dialog or text that responds to customer questions or reactions with the desired behavioral paradigm while progressing through the ordered set of topics and/or other context associated with the best practices in the retrained contextual model.

Process 1200 includes detecting (at 1216) an objection or response that deviates from the best practices of the retrained contextual model and/or that corresponds to a contextual tracker 603 that is associated with a negative or unsuccessful outcome. For instance, the customer may explicitly object to the pricing of a discussed product, or may implicitly object based on tone or sentiment.

Process 1200 includes dynamically generating (at 1218) a response to the objection based on contextual trackers 603 identifying the same or similar objections in the monitored conversations. The objection is typically associated with an unsuccessful engagement, and may therefore not be accounted for in the modeled best practices. Accordingly, controller 109 may detect contextual trackers 603 that identify the same or similar objections in the monitored conversations, analyze contextual trackers 603 for the agent-provided responses to the objections, and/or determine whether the provided responses had any effect on changing the engagement outcome. Dynamically generating (at 1218) the response may include mirroring a particular agent-provided response according to the desired behavioral paradigm if that particular agent-provided response improved the engagement outcome, or modifying the response to deviate from the particular agent-provided response if that particular agent-provided response contributed to an unsuccessful engagement.

Figure 13:
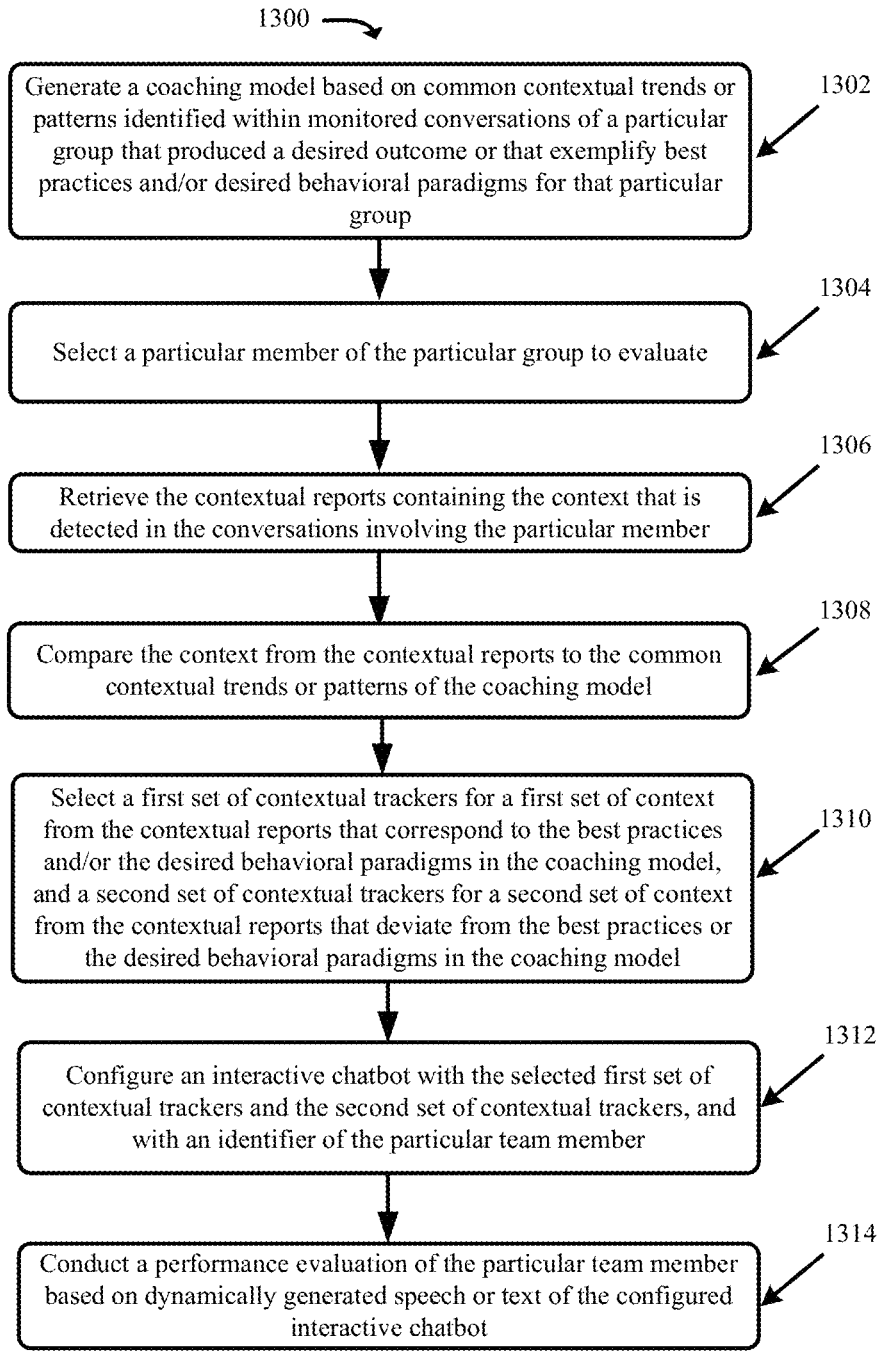
FIG. 13 presents a process for automating the training of agents with an interactive chatbot in accordance with some embodiments presented herein.

FIG. 13 presents a process 1300 for automating the training of agents with an interactive chatbot in accordance with some embodiments presented herein. Process 1200 is implemented by automated conference monitoring system 100, and more specifically, by controller 109 of automated conference monitoring system 100.

Process 1300 includes generating (at 1302) a coaching model based on common contextual trends or patterns identified within monitored conversations of a particular group that produced a desired outcome or that exemplify best practices and/or desired behavioral paradigms for that particular group. For instance, controller 109 may generate (at 1302) the coaching model according to the operations described above with reference to FIG. 11.

Process 1300 includes selecting (at 1304) a particular member of the particular group to evaluate. The selection (at 1304) may be made periodically (e.g., quarterly review, annual review, etc.), based on specific events associated with the particular member (e.g., the particular member having a conversion rate that is below a specified threshold), or in response to user input.

Process 1300 includes retrieving (at 1306) contextual reports 600 containing the context that is detected in the conversations involving the particular member. In some embodiments, controller 109 may query the transcripts that are associated with the monitored conversations to identify the subset of conversations involving the particular member.

Process 1300 includes comparing (at 1308) the context from contextual reports 600 to the common contextual trends or patterns of the coaching model, and selecting (at 1310) a first set of contextual trackers 603 for a first set of context from contextual reports 600 that correspond to the best practices and/or the desired behavioral paradigms in the coaching model, and a second set of contextual trackers 603 for a second set of context from contextual reports 600 that deviate from the best practices or the desired behavioral paradigms in the coaching model. In some embodiments, the second set of contextual trackers 603 match to contextual trackers 603 in the coaching model for context that is associated with or that contributes to an unsuccessful engagement.

Process 1300 includes configuring (at 1312) an interactive chatbot with the selected (at 1310) first set of contextual trackers 603 and the second set of contextual trackers 603, and with an identifier of the particular team member. Process 1300 includes conducting (at 1314) a performance evaluation of the particular team member based on dynamically generated speech or text of the configured (at 1312) interactive chatbot. In some embodiments, the interactive chatbot contacts the particular team member and presents the first set of contextual trackers 603 as correct actions or behavior to repeat, and the second set of contextual trackers 603 as improper actions or behavior to avoid. Additionally, the interactive chatbot may playback the conference segments linked to the second set of contextual trackers 603 to provide explicit examples of the undesired behavior, and may playback segments from other conferences that provide examples of the desired behavior for the same context.

In this case, the interactive chatbot assumes the role of a team manager and/or performs performance reviews on behalf of the team manager. The interactive chatbot provides unbiased feedback that is derived from objective evidence of practices and/or behaviors that result in a successful engagement and/or produce desired outcomes. Moreover, the interactive chatbot provides explicit customized examples of the particular member's actions or behaviors that should be modified, corrected, or improved so that the particular member is not left guessing on how or what actions or behaviors to change.

Controller 109 may track the particular member's actions or behaviors over time and after each performance evaluation to determine if the particular member has implemented the requested changes or if additional coaching or training is needed. In some embodiments, controller 109 may track the particular member's actions or behaviors in real time as the particular member is engaged in an active conference. In some such embodiments, controller 109 may generate real-time alerts, instructions, and/or content to provide to a device of the particular member while the conference is ongoing. The alerts may indicate when actions or behaviors of the particular member deviate from best practices or desired behavioral paradigms. The instructions may include identification of specific topics to discuss or behavioral changes. For instance, controller 109 may notify the particular member when they are speaking too fast, when they are speaking for too long of a duration, when questions are not posed to the customer, and/or when they interrupt the customer. The content may include information about a product, service, or feature that is mentioned in the conference by the particular member or the customer. For instance, the automatic conference monitoring may detect context related to pricing while discussing a particular product, and controller 109 may retrieve and present the particular product pricing on a display of the particular member.

The embodiments presented above are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the above descriptions are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things ("IoT") devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory ("RAM"), read only memory ("ROM"), electrically erasable programmable ROM ("EEPROM"), flash memory, or other memory technology, compact disk ROM ("CD-ROM"), digital versatile disks ("DVDs") or other optical storage, solid state drives, hard drives, hybrid drive, or any other medium that can be used to store the desired information and that can be accessed to retrieve that information.

It is appreciated that the presented systems and methods can be implemented in a variety of architectures and configurations. For example, the systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

What is claimed is:

1. A computer-implemented method for automated conversation monitoring, the computer-implemented method comprising:
  receiving, by a monitoring system, a plurality of conversations that result in an unsuccessful engagement;
  classifying, by the monitoring system, each segment of a plurality of segments extracted from each conversation of the plurality of conversations based on an audio from each segment mapping to one or more contextual trackers from a plurality of contextual trackers;
  determining, by the monitoring system, a recurring pattern of a common set of contextual trackers in different segments of the plurality of conversations that contribute to the unsuccessful engagement;
  monitoring, by the monitoring system, a particular conversation;
  tagging, by the monitoring system, one or more segments of the particular conversation with the common set of contextual trackers; and
  performing, by the monitoring system, one or more actions that contribute to a successful engagement in response to tagging the one or more segments with the common set of contextual trackers and the common set of contextual trackers contributing to the unsuccessful engagement.

2. The computer-implemented method of claim 1, further comprising:
  receiving an audio stream of the particular conversation;
  parsing the audio stream into a plurality of snippets, each snippet of the plurality of snippets comprising audio from a different portion of the audio stream, and each snippet corresponding to a different segment of the one or more segments; and
  wherein tagging the one or more segments comprises:
    matching audio or signal characteristics in a particular snippet of the plurality of snippets to a definition of one or more of the common set of contextual trackers.

3. The computer-implemented method of claim 1, wherein tagging the one or more segments comprises:
  detecting a question that is asked in a particular segment of the one or more segments based on signal characteristics of the particular segment matching a classification that is defined for the question; and
  assigning a particular contextual tracker to the particular segment, the particular contextual tracker comprising an identifier that identifies the question in the particular segment, and a link to a portion of audio in the particular segment where the question is asked.

4. The computer-implemented method of claim 1, further comprising:
  generating a contextual report comprising the common set of contextual trackers with links to the one or more segments of the particular conversation where different context associated with each contextual tracker of the common set of contextual trackers is detected in the particular conversation.

5. The computer-implemented method of claim 1, further comprising:
  defining a contextual model that differentiates the common set of contextual trackers from other contextual trackers of the plurality of contextual trackers based on said determining the recurring pattern, wherein defining the contextual model comprises attributing relevance between each contextual tracker of the common set of contextual trackers and the unsuccessful engagement.

6. The computer-implemented method of claim 1, further comprising:
  receiving session information with the particular conversation, wherein the session information comprises one or more of an identifier for each conference device connected to the particular conversation or an identifier of each participant in the particular conversation;
  detecting different speakers speaking in a plurality of snippets of the particular conversation using the session information; and
  generating a transcript of the particular conversation with an identification of each different speaker that is detected to be speaking in each snippet of the plurality of snippets.

7. The computer-implemented method of claim 6, wherein detecting the different speakers comprises:
  retrieving a voiceprint for each of the different speakers based on the session information, the voiceprint comprising one or more of an audio sample or voice characteristics of a particular speaker; and matching audio from each snippet of the plurality of snippets to the voiceprint of at least one of the different speakers.

8. The computer-implemented method of claim 1, wherein performing the one or more actions comprises:
configuring a chatbot based on said tagging; and
generating dialog with the chatbot that is presented during the particular conversation.

9. The computer-implemented method of claim 1, further comprising:
initiating the particular conversation with a chatbot having a first configuration, wherein the chatbot generates dialog based on the first configuration during a first part of the particular conversation;
reconfiguring the chatbot with a second configuration in response to tagging the one or more segments with the common set of contextual trackers and the common set of contextual trackers contributing to the unsuccessful engagement; and
continuing the particular conversation with the chatbot having the second configuration during a second part of the particular conversation that occurs after said reconfiguring.

10. The computer-implemented method of claim 1, further comprising:
monitoring a set of active conversations involving a particular group, the set of active conversations comprising the particular conversation;
detecting the unsuccessful engagement within the particular conversation of the set of active conversations in response to tagging the one or more segments with the common set of contextual trackers; and
wherein performing the one or more actions comprises:
alerting a user with an oversight role over the particular group about the unsuccessful engagement detected in the particular conversation.

11. The computer-implemented method of claim 1, further comprising:
monitoring a set of active conversations involving a particular group, the set of active conversations comprising the particular conversation;
detecting the unsuccessful engagement within the particular conversation of the set of active conversations in response to tagging the one or more segments with the common set of contextual trackers; and
wherein performing the one or more actions comprises:
connecting a device of a user with an oversight role over the particular group to the particular conversation.

12. The computer-implemented method of claim 1, wherein performing the one or more actions comprises:
configuring a chatbot to perform a performance review of an agent that participants in the particular conversation; and
presenting, by execution of the chatbot, one or more of audio from the one or more segments or text from a transcription of the one or more segments during the performance review.

13. A monitoring system for automated conference monitoring, the monitoring system comprising:
one or more hardware processors configured to:
receive a plurality of conversations that result in an unsuccessful engagement;
classify each segment of a plurality of segments extracted from each conversation of the plurality of conversations based on an audio from each segment mapping to one or more contextual trackers from a plurality of contextual trackers;
determine a recurring pattern of a common set of contextual trackers in different segments of the plurality of conversations that contribute to the unsuccessful engagement;
monitor a particular conversation;
tag one or more segments of the particular conversation with the common set of contextual trackers; and
perform one or more actions that contribute to a successful engagement in response to tagging the one or more segments with the common set of contextual trackers and the common set of contextual trackers contributing to the unsuccessful engagement.

14. The monitoring system of claim 13, wherein the one or more hardware processors are further configured to:
receive an audio stream of the particular conversation;
parse the audio stream into a plurality of snippets, each snippet of the plurality of snippets comprising audio from a different portion of the audio stream, and each snippet corresponding to a different segment of the one or more segments; and
wherein tagging the one or more segments comprises:
matching audio or signal characteristics in a particular snippet of the plurality of snippets to a definition of one or more of the common set of contextual trackers.

15. The monitoring system of claim 13, wherein tagging the one or more segments comprises:
detecting a question that is asked in a particular segment of the one or more segments based on signal characteristics of the particular segment matching a classification that is defined for the question; and
assigning a particular contextual tracker to the particular segment, the particular contextual tracker comprising an identifier that identifies the question in the particular segment, and a link to a portion of audio in the particular segment where the question is asked.

16. The monitoring system of claim 13, wherein the one or more hardware processors are further configured to:
generate a contextual report comprising the common set of contextual trackers with links to the one or more segments of the particular conversation where different context associated with each contextual tracker of the common set of contextual trackers is detected in the particular conversation.

17. The monitoring system of claim 13, wherein the one or more hardware processors are further configured to:
define a contextual model that differentiates the common set of contextual trackers from other contextual trackers of the plurality of contextual trackers based on said determining the recurring pattern, wherein defining the contextual model comprises attributing relevance between each contextual tracker of the common set of contextual trackers and the unsuccessful engagement.

18. The monitoring system of claim 13, wherein the one or more hardware processors are further configured to:
receive session information with the particular conversation, wherein the session information comprises one or more of an identifier for each conference device connected to the particular conversation or an identifier of each participant in the particular conversation;
detect different speakers speaking in a plurality of snippets of the particular conversation using the session information; and generate a transcript of the particular conversation with an identification of each different speaker that is detected to be speaking in each snippet of the plurality of snippets.

19. The monitoring system of claim 13, wherein the one or more hardware processors are further configured to:
configure a chatbot based on said tagging; and
generate dialog with the chatbot that is presented during the particular conversation.

20. A non-transitory computer-readable medium storing program instructions that, when executed by one or more hardware processors of a monitoring system, cause the monitoring system to perform operations comprising:
receive a plurality of conversations that result in an unsuccessful engagement;
classify each segment of a plurality of segments extracted from each conversation of the plurality of conversations based on an audio from each segment mapping to one or more contextual trackers from a plurality of contextual trackers;
determine a recurring pattern of a common set of contextual trackers in different segments of the plurality of conversations that contribute to the unsuccessful engagement;
monitor a particular conversation;
tag one or more segments of the particular conversation with the common set of contextual trackers; and
perform one or more actions that contribute to a successful engagement in response to tagging the one or more segments with the common set of contextual trackers and the common set of contextual trackers contributing to the unsuccessful engagement.

* * * * *